US010553216B2

(12) United States Patent
Kennewick et al.

(10) Patent No.: US 10,553,216 B2
(45) Date of Patent: *Feb. 4, 2020

(54) SYSTEM AND METHOD FOR AN INTEGRATED, MULTI-MODAL, MULTI-DEVICE NATURAL LANGUAGE VOICE SERVICES ENVIRONMENT

(71) Applicant: Oracle International Corporation, Redwood Shores, CA (US)

(72) Inventors: Robert A. Kennewick, Seattle, WA (US); Chris Weider, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/142,227

(22) Filed: Sep. 26, 2018

(65) Prior Publication Data
US 2019/0027146 A1 Jan. 24, 2019

Related U.S. Application Data

(63) Continuation of application No. 15/632,713, filed on Jun. 26, 2017, now Pat. No. 10,089,984, which is a
(Continued)

(51) Int. Cl.
*G10L 15/00* (2013.01)
*G10L 15/22* (2006.01)
(Continued)

(52) U.S. Cl.
CPC ............. *G10L 15/22* (2013.01); *G06F 3/167* (2013.01); *G06F 17/28* (2013.01);
(Continued)

(58) Field of Classification Search
CPC ....... G10L 15/22; G10L 15/265; G06F 3/167; H04M 2201/40
(Continued)

(56) References Cited

U.S. PATENT DOCUMENTS 4,430,669 A 2/1984 Cheung
4,821,027 A 4/1989 Mallory
(Continued)

FOREIGN PATENT DOCUMENTS

CN 1433554 A 7/2003
CN 1860496 A 11/2006
(Continued)

OTHER PUBLICATIONS

"Statement in Accordance with the Notice from the European Patent Office" dated Oct. 1, 2007 Concerning Business Methods (OJ EPO Nov. 2007, 592-593), XP002456252.
(Continued)

*Primary Examiner* — Jesse S Pullias
(74) *Attorney, Agent, or Firm* — Kilpatrick Townsend & Stockton LLP

(57) ABSTRACT

A system and method for an integrated, multi-modal, multi-device natural language voice services environment may be provided. In particular, the environment may include a plurality of voice-enabled devices each having intent determination capabilities for processing multi-modal natural language utterances in addition to knowledge of the intent determination capabilities of other devices in the environment. Further, the environment may be arranged in a centralized manner, a distributed peer-to-peer manner, or various combinations thereof. As such, the various devices may cooperate to determine intent of multi-modal natural language utterances, and commands, queries, or other requests may be routed to one or more of the devices best suited to take action in response thereto.

20 Claims, 7 Drawing Sheets

Related U.S. Application Data continuation of application No. 15/090,215, filed on Apr. 4, 2016, now Pat. No. 9,711,143, which is a continuation of application No. 14/083,061, filed on Nov. 18, 2013, now Pat. No. 9,305,548, which is a continuation of application No. 12/127,343, filed on May 27, 2008, now Pat. No. 8,589,161.

(51) Int. Cl.

| | | |
|---|---|---|
| *G10L 15/18* | (2013.01) | |
| *G10L 15/32* | (2013.01) | |
| *G10L 15/30* | (2013.01) | |
| *G06F 17/28* | (2006.01) | |
| *G10L 15/24* | (2013.01) | |
| *G10L 15/26* | (2006.01) | |
| *G06F 3/16* | (2006.01) | |
| *G10L 15/28* | (2013.01) | |

(52) U.S. Cl.
CPC .......... *G10L 15/1822* (2013.01); *G10L 15/24* (2013.01); *G10L 15/26* (2013.01); *G10L 15/285* (2013.01); *G10L 15/30* (2013.01); *G10L 15/32* (2013.01); *G10L 2015/223* (2013.01)

(58) Field of Classification Search
USPC .................................. 704/231–257, 270–275
See application file for complete search history.

(56) References Cited

U.S. PATENT DOCUMENTS

| | | |
|---|---|---|
| 4,829,423 A | 5/1989 | Tennant |
| 4,887,212 A | 12/1989 | Zamora |
| 4,910,784 A | 3/1990 | Doddington |
| 5,027,406 A | 6/1991 | Roberts |
| 5,155,743 A | 10/1992 | Jacobs |
| 5,164,904 A | 11/1992 | Sumner |
| 5,208,748 A | 5/1993 | Flores |
| 5,265,065 A | 11/1993 | Turtle |
| 5,274,560 A | 12/1993 | LaRue |
| 5,331,554 A | 7/1994 | Graham |
| 5,357,596 A | 10/1994 | Takebayashi |
| 5,369,575 A | 11/1994 | Lamberti |
| 5,377,350 A | 12/1994 | Skinner |
| 5,386,556 A | 1/1995 | Hedin |
| 5,424,947 A | 6/1995 | Nagao |
| 5,471,318 A | 11/1995 | Ahuja |
| 5,475,733 A | 12/1995 | Eisdorfer |
| 5,479,563 A | 12/1995 | Yamaguchi |
| 5,488,652 A | 1/1996 | Bielby |
| 5,499,289 A | 3/1996 | Bruno |
| 5,500,920 A | 3/1996 | Kupiec |
| 5,517,560 A | 5/1996 | Greenspan |
| 5,533,108 A | 7/1996 | Harris |
| 5,537,436 A | 7/1996 | Bottoms |
| 5,539,744 A | 7/1996 | Chu |
| 5,557,667 A | 9/1996 | Bruno |
| 5,559,864 A | 9/1996 | Kennedy, Jr. |
| 5,563,937 A | 10/1996 | Bruno |
| 5,577,165 A | 11/1996 | Takebayashi |
| 5,590,039 A | 12/1996 | Ikeda |
| 5,608,635 A | 3/1997 | Tamai |
| 5,615,296 A | 3/1997 | Stanford |
| 5,617,407 A | 4/1997 | Bareis |
| 5,633,922 A | 5/1997 | August |
| 5,634,086 A | 5/1997 | Rtischev |
| 5,652,570 A | 7/1997 | Lepkofker |
| 5,675,629 A | 10/1997 | Raffel |
| 5,696,965 A | 12/1997 | Dedrick |
| 5,708,422 A | 1/1998 | Blonder |
| 5,721,938 A | 2/1998 | Stuckey |
| 5,722,084 A | 2/1998 | Chakrin |
| 5,740,256 A | 4/1998 | CastelloDaCosta |
| 5,742,763 A | 4/1998 | Jones |
| 5,748,841 A | 5/1998 | Morin |
| 5,748,974 A | 5/1998 | Johnson |
| 5,752,052 A | 5/1998 | Richardson |
| 5,754,784 A | 5/1998 | Garland |
| 5,761,631 A | 6/1998 | Nasukawa |
| 5,774,841 A | 6/1998 | Salazar |
| 5,774,859 A | 6/1998 | Houser |
| 5,794,050 A | 8/1998 | Dahlgren |
| 5,794,196 A | 8/1998 | Yegnanarayanan |
| 5,797,112 A | 8/1998 | Komatsu |
| 5,799,276 A | 8/1998 | Komissarchik |
| 5,802,510 A | 9/1998 | Jones |
| 5,829,000 A | 10/1998 | Huang |
| 5,832,221 A | 11/1998 | Jones |
| 5,839,107 A | 11/1998 | Gupta |
| 5,848,396 A | 12/1998 | Gerace |
| 5,855,000 A | 12/1998 | Waibel |
| 5,860,059 A | 1/1999 | Aust |
| 5,867,817 A | 2/1999 | Catallo |
| 5,878,385 A | 3/1999 | Bralich |
| 5,878,386 A | 3/1999 | Coughlin |
| 5,892,813 A | 4/1999 | Morin |
| 5,892,900 A | 4/1999 | Ginter |
| 5,895,464 A | 4/1999 | Bhandari |
| 5,895,466 A | 4/1999 | Goldberg |
| 5,897,613 A | 4/1999 | Chan |
| 5,899,991 A | 5/1999 | Karch |
| 5,902,347 A | 5/1999 | Backman |
| 5,911,120 A | 6/1999 | Jarett |
| 5,918,222 A | 6/1999 | Fukui |
| 5,926,784 A | 7/1999 | Richardson |
| 5,933,822 A | 8/1999 | Braden-Harder |
| 5,950,167 A | 9/1999 | Yaker |
| 5,953,393 A | 9/1999 | Culbreth |
| 5,960,384 A | 9/1999 | Brash |
| 5,960,397 A | 9/1999 | Rahim |
| 5,960,399 A | 9/1999 | Barclay |
| 5,960,447 A | 9/1999 | Holt |
| 5,963,894 A | 10/1999 | Richardson |
| 5,963,940 A | 10/1999 | Liddy |
| 5,982,906 A | 11/1999 | Ono |
| 5,983,190 A | 11/1999 | Trowerll |
| 5,987,404 A | 11/1999 | DellaPietra |
| 5,991,721 A | 11/1999 | Asano |
| 5,995,119 A | 11/1999 | Cosatto |
| 5,995,928 A | 11/1999 | Nguyen |
| 5,995,943 A | 11/1999 | Bull |
| 6,009,382 A | 12/1999 | Martino |
| 6,014,559 A | 1/2000 | Amin |
| 6,018,708 A | 1/2000 | Dahan |
| 6,021,384 A | 2/2000 | Gorin |
| 6,028,514 A | 2/2000 | Lemelson |
| 6,035,267 A | 3/2000 | Watanabe |
| 6,044,347 A | 3/2000 | Abella |
| 6,049,602 A | 4/2000 | Foladare |
| 6,049,607 A | 4/2000 | Marash |
| 6,058,187 A | 5/2000 | Chen |
| 6,067,513 A | 5/2000 | Ishimitsu |
| 6,073,098 A | 6/2000 | Buchsbaum |
| 6,076,059 A | 6/2000 | Glickman |
| 6,078,886 A | 6/2000 | Dragosh |
| 6,081,774 A | 6/2000 | deHita |
| 6,085,186 A | 7/2000 | Christianson |
| 6,101,241 A | 8/2000 | Boyce |
| 6,108,631 A | 8/2000 | Ruhl |
| 6,119,087 A | 9/2000 | Kuhn |
| 6,119,101 A | 9/2000 | Peckover |
| 6,122,613 A | 9/2000 | Baker |
| 6,134,235 A | 10/2000 | Goldman |
| 6,144,667 A | 11/2000 | Doshi |
| 6,144,938 A | 11/2000 | Surace |
| 6,154,526 A | 11/2000 | Dahlke |
| 6,160,883 A | 12/2000 | Jackson |
| 6,167,377 A | 12/2000 | Gillick |
| 6,173,266 B1 | 1/2001 | Marx |
| 6,173,279 B1 | 1/2001 | Levin |
| 6,175,858 B1 | 1/2001 | Bulfer |
| 6,185,535 B1 | 2/2001 | Hedin |

(56) References Cited

U.S. PATENT DOCUMENTS

| | | |
|---|---|---|
| 6,188,982 B1 | 2/2001 | Chiang |
| 6,192,110 B1 | 2/2001 | Abella |
| 6,192,338 B1 | 2/2001 | Haszto |
| 6,195,634 B1 | 2/2001 | Dudemaine |
| 6,195,651 B1 | 2/2001 | Handel |
| 6,199,043 B1 | 3/2001 | Happ |
| 6,208,964 B1 | 3/2001 | Sabourin |
| 6,208,972 B1 | 3/2001 | Grant |
| 6,219,346 B1 | 4/2001 | Maxemchuk |
| 6,219,643 B1 | 4/2001 | Cohen |
| 6,219,645 B1 | 4/2001 | Byers |
| 6,226,612 B1 | 5/2001 | Srenger |
| 6,233,556 B1 | 5/2001 | Teunen |
| 6,233,559 B1 | 5/2001 | Balakrishnan |
| 6,233,561 B1 | 5/2001 | Junqua |
| 6,236,968 B1 | 5/2001 | Kanevsky |
| 6,243,679 B1 | 6/2001 | Mohri |
| 6,246,981 B1 | 6/2001 | Papineni |
| 6,246,990 B1 | 6/2001 | Happ |
| 6,266,636 B1 | 7/2001 | Kosaka |
| 6,269,336 B1 | 7/2001 | Ladd |
| 6,272,455 B1 | 8/2001 | Hoshen |
| 6,272,461 B1 | 8/2001 | Meredith |
| 6,275,231 B1 | 8/2001 | Obradovich |
| 6,278,377 B1 | 8/2001 | DeLine |
| 6,278,968 B1 | 8/2001 | Franz |
| 6,286,002 B1 | 9/2001 | Axaopoulos |
| 6,288,319 B1 | 9/2001 | Catona |
| 6,292,767 B1 | 9/2001 | Jackson |
| 6,301,560 B1 | 10/2001 | Masters |
| 6,308,151 B1 | 10/2001 | Smith |
| 6,311,159 B1 | 10/2001 | VanTichelen |
| 6,314,402 B1 | 11/2001 | Monaco |
| 6,321,196 B1 | 11/2001 | Franceschi |
| 6,356,869 B1 | 3/2002 | Chapados |
| 6,362,748 B1 | 3/2002 | Huang |
| 6,366,882 B1 | 4/2002 | Bijl |
| 6,366,886 B1 | 4/2002 | Dragosh |
| 6,374,214 B1 | 4/2002 | Friedland |
| 6,374,226 B1 | 4/2002 | Hunt |
| 6,377,913 B1 | 4/2002 | Coffman |
| 6,377,919 B1 | 4/2002 | Burnett |
| 6,381,535 B1 | 4/2002 | Durocher |
| 6,385,596 B1 | 5/2002 | Wiser |
| 6,385,646 B1 | 5/2002 | Brown |
| 6,389,398 B1 | 5/2002 | Lustgarten |
| 6,393,403 B1 | 5/2002 | Majaniemi |
| 6,393,428 B1 | 5/2002 | Miller |
| 6,397,181 B1 | 5/2002 | Li |
| 6,404,878 B1 | 6/2002 | Jackson |
| 6,405,170 B1 | 6/2002 | Phillips |
| 6,408,272 B1 | 6/2002 | White |
| 6,411,810 B1 | 6/2002 | Maxemchuk |
| 6,411,893 B2 | 6/2002 | Ruhl |
| 6,415,257 B1 | 7/2002 | Junqua |
| 6,418,210 B1 | 7/2002 | Sayko |
| 6,420,975 B1 | 7/2002 | DeLine |
| 6,429,813 B2 | 8/2002 | Feigen |
| 6,430,285 B1 | 8/2002 | Bauer |
| 6,430,531 B1 | 8/2002 | Polish |
| 6,434,523 B1 | 8/2002 | Monaco |
| 6,434,524 B1 | 8/2002 | Weber |
| 6,434,529 B1 | 8/2002 | Walker |
| 6,442,522 B1 | 8/2002 | Carberry |
| 6,446,114 B1 | 9/2002 | Bulfer |
| 6,453,153 B1 | 9/2002 | Bowker |
| 6,453,292 B2 | 9/2002 | Ramaswamy |
| 6,456,711 B1 | 9/2002 | Cheung |
| 6,456,974 B1 | 9/2002 | Baker |
| 6,466,654 B1 | 10/2002 | Cooper |
| 6,466,899 B1 | 10/2002 | Yano |
| 6,470,315 B1 | 10/2002 | Netsch |
| 6,487,494 B2 | 11/2002 | Odinak |
| 6,487,495 B1 | 11/2002 | Gale |
| 6,498,797 B1 | 12/2002 | Anerousis |
| 6,499,013 B1 | 12/2002 | Weber |
| 6,501,833 B2 | 12/2002 | Phillips |
| 6,501,834 B1 | 12/2002 | Milewski |
| 6,505,155 B1 | 1/2003 | Vanbuskirk |
| 6,510,417 B1 | 1/2003 | Woods |
| 6,513,006 B2 | 1/2003 | Howard |
| 6,522,746 B1 | 2/2003 | Marchok |
| 6,523,061 B1 | 2/2003 | Halverson |
| 6,532,444 B1 | 3/2003 | Weber |
| 6,539,348 B1 | 3/2003 | Bond |
| 6,549,629 B2 | 4/2003 | Finn |
| 6,553,372 B1 | 4/2003 | Brassell |
| 6,556,970 B1 | 4/2003 | Sasaki |
| 6,556,973 B1 | 4/2003 | Lewin |
| 6,560,576 B1 | 5/2003 | Cohen |
| 6,560,590 B1 | 5/2003 | Shwe |
| 6,567,778 B1 | 5/2003 | ChaoChang |
| 6,567,797 B1 | 5/2003 | Schuetze |
| 6,567,805 B1 | 5/2003 | Johnson |
| 6,570,555 B1 | 5/2003 | Prevost |
| 6,570,964 B1 | 5/2003 | Murveit |
| 6,571,279 B1 | 5/2003 | Herz |
| 6,574,597 B1 | 6/2003 | Mohri |
| 6,574,624 B1 | 6/2003 | Johnson |
| 6,578,022 B1 | 6/2003 | Foulger |
| 6,581,103 B1 | 6/2003 | Dengler |
| 6,584,439 B1 | 6/2003 | Geilhufe |
| 6,587,858 B1 | 7/2003 | Strazza |
| 6,591,185 B1 | 7/2003 | Polidi |
| 6,591,239 B1 | 7/2003 | McCall |
| 6,594,257 B1 | 7/2003 | Doshi |
| 6,594,367 B1 | 7/2003 | Marash |
| 6,598,018 B1 | 7/2003 | Junqua |
| 6,601,026 B2 | 7/2003 | Appelt |
| 6,601,029 B1 | 7/2003 | Pickering |
| 6,604,075 B1 | 8/2003 | Brown |
| 6,604,077 B2 | 8/2003 | Dragosh |
| 6,606,598 B1 | 8/2003 | Holthouse |
| 6,611,692 B2 | 8/2003 | Raffel |
| 6,614,773 B1 | 9/2003 | Maxemchuk |
| 6,615,172 B1 | 9/2003 | Bennett |
| 6,622,119 B1 | 9/2003 | Ramaswamy |
| 6,629,066 B1 | 9/2003 | Jackson |
| 6,631,346 B1 | 10/2003 | Karaorman |
| 6,631,351 B1 | 10/2003 | Ramachandran |
| 6,633,846 B1 | 10/2003 | Bennett |
| 6,636,790 B1 | 10/2003 | Lightner |
| 6,643,620 B1 | 11/2003 | Contolini |
| 6,647,363 B2 | 11/2003 | Claassen |
| 6,650,747 B1 | 11/2003 | Bala |
| 6,658,388 B1 | 12/2003 | Kleindienst |
| 6,678,680 B1 | 1/2004 | Woo |
| 6,681,206 B1 | 1/2004 | Gorin |
| 6,691,151 B1 | 2/2004 | Cheyer |
| 6,701,294 B1 | 3/2004 | Ball |
| 6,704,396 B2 | 3/2004 | Parolkar |
| 6,704,576 B1 | 3/2004 | Brachman |
| 6,704,708 B1 | 3/2004 | Pickering |
| 6,707,421 B1 | 3/2004 | Drury |
| 6,708,150 B1 | 3/2004 | Hirayama |
| 6,721,001 B1 | 4/2004 | Berstis |
| 6,721,633 B2 | 4/2004 | Funk |
| 6,721,706 B1 | 4/2004 | Strubbe |
| 6,726,636 B2 | 4/2004 | DerGhazarian |
| 6,732,088 B1 | 5/2004 | Glance |
| 6,735,592 B1 | 5/2004 | Neumann |
| 6,739,556 B1 | 5/2004 | Langston |
| 6,741,931 B1 | 5/2004 | Kohut |
| 6,742,021 B1 | 5/2004 | Halverson |
| 6,745,161 B1 | 6/2004 | Arnold |
| 6,751,591 B1 | 6/2004 | Gorin |
| 6,751,612 B1 | 6/2004 | Schuetze |
| 6,754,485 B1 | 6/2004 | Obradovich |
| 6,754,627 B2 | 6/2004 | Woodward |
| 6,754,647 B1 | 6/2004 | Tackett |
| 6,757,544 B2 | 6/2004 | Rangarajan |
| 6,757,718 B1 | 6/2004 | Halverson |
| 6,785,651 B1 | 8/2004 | Wang |
| 6,795,808 B1 | 9/2004 | Strubbe |

(56) References Cited

U.S. PATENT DOCUMENTS

| | | |
|---|---|---|
| 6,801,604 B2 | 10/2004 | Maes |
| 6,801,893 B1 | 10/2004 | Backfried |
| 6,804,330 B1 | 10/2004 | Jones |
| 6,810,375 B1 | 10/2004 | Ejerhed |
| 6,813,341 B1 | 11/2004 | Mahoney |
| 6,816,830 B1 | 11/2004 | Kempe |
| 6,823,308 B2 | 11/2004 | Keiller |
| 6,829,603 B1 | 12/2004 | Chai |
| 6,832,230 B1 | 12/2004 | Zilliacus |
| 6,833,848 B1 | 12/2004 | Wolff |
| 6,850,603 B1 | 2/2005 | Eberle |
| 6,856,990 B2 | 2/2005 | Barile |
| 6,865,481 B2 | 3/2005 | Kawazoe |
| 6,868,380 B2 | 3/2005 | Kroeker |
| 6,868,385 B1 | 3/2005 | Gerson |
| 6,871,179 B1 | 3/2005 | Kist |
| 6,873,837 B1 | 3/2005 | Yoshioka |
| 6,877,001 B2 | 4/2005 | Wolf |
| 6,877,134 B1 | 4/2005 | Fuller |
| 6,882,970 B1 | 4/2005 | Garner |
| 6,901,366 B1 | 5/2005 | Kuhn |
| 6,910,003 B1 | 6/2005 | Arnold |
| 6,912,498 B2 | 6/2005 | Stevens |
| 6,915,126 B2 | 7/2005 | Mazzara, Jr. |
| 6,928,614 B1 | 8/2005 | Everhart |
| 6,934,756 B2 | 8/2005 | Maes |
| 6,937,977 B2 | 8/2005 | Gerson |
| 6,937,982 B2 | 8/2005 | Kitaoka |
| 6,941,266 B1 | 9/2005 | Gorin |
| 6,944,594 B2 | 9/2005 | Busayapongchai |
| 6,950,821 B2 | 9/2005 | Faybishenko |
| 6,954,755 B2 | 10/2005 | Reisman |
| 6,959,276 B2 | 10/2005 | Droppo |
| 6,961,700 B2 | 11/2005 | Mitchell |
| 6,963,759 B1 | 11/2005 | Gerson |
| 6,964,023 B2 | 11/2005 | Maes |
| 6,968,311 B2 | 11/2005 | Knockeart |
| 6,973,387 B2 | 12/2005 | Masclet |
| 6,975,983 B1 | 12/2005 | Fortescue |
| 6,975,993 B1 | 12/2005 | Keiller |
| 6,980,092 B2 | 12/2005 | Turnbull |
| 6,983,055 B2 | 1/2006 | Luo |
| 6,990,513 B2 | 1/2006 | Belfiore |
| 6,996,531 B2 | 2/2006 | Korall |
| 7,003,463 B1 | 2/2006 | Maes |
| 7,016,849 B2 | 3/2006 | Arnold |
| 7,020,609 B2 | 3/2006 | Thrift |
| 7,024,364 B2 | 4/2006 | Guerra |
| 7,027,586 B2 | 4/2006 | Bushey |
| 7,027,974 B1 | 4/2006 | Busch |
| 7,027,975 B1 | 4/2006 | Pazandak |
| 7,031,908 B1 | 4/2006 | Huang |
| 7,035,415 B2 | 4/2006 | Belt |
| 7,036,128 B1 | 4/2006 | Julia |
| 7,043,425 B2 | 5/2006 | Pao |
| 7,054,817 B2 | 5/2006 | Shao |
| 7,058,890 B2 | 6/2006 | George |
| 7,062,488 B1 | 6/2006 | Reisman |
| 7,069,220 B2 | 6/2006 | Coffman |
| 7,072,834 B2 | 7/2006 | Zhou |
| 7,072,888 B1 | 7/2006 | Perkins |
| 7,076,362 B2 | 7/2006 | Ohtsuji |
| 7,082,469 B2 | 7/2006 | Gold |
| 7,085,708 B2 | 8/2006 | Manson |
| 7,092,928 B1 | 8/2006 | Elad |
| 7,107,210 B2 | 9/2006 | Deng |
| 7,107,218 B1 | 9/2006 | Preston |
| 7,110,951 B1 | 9/2006 | Lemelson |
| 7,127,395 B1 | 10/2006 | Gorin |
| 7,127,400 B2 | 10/2006 | Koch |
| 7,130,390 B2 | 10/2006 | Abburi |
| 7,136,875 B2 | 11/2006 | Anderson |
| 7,137,126 B1 | 11/2006 | Coffman |
| 7,143,037 B1 | 11/2006 | Chestnut |
| 7,143,039 B1 | 11/2006 | Stifelman |
| 7,146,315 B2 | 12/2006 | Balan |
| 7,146,319 B2 | 12/2006 | Hunt |
| 7,149,696 B2 | 12/2006 | Shimizu |
| 7,165,028 B2 | 1/2007 | Gong |
| 7,170,993 B2 | 1/2007 | Anderson |
| 7,171,291 B2 | 1/2007 | Obradovich |
| 7,174,300 B2 | 2/2007 | Bush |
| 7,177,798 B2 | 2/2007 | Hsu |
| 7,184,957 B2 | 2/2007 | Brookes |
| 7,190,770 B2 | 3/2007 | Ando |
| 7,197,069 B2 | 3/2007 | Agazzi |
| 7,197,460 B1 | 3/2007 | Gupta |
| 7,203,644 B2 | 4/2007 | Anderson |
| 7,206,418 B2 | 4/2007 | Yang |
| 7,207,011 B2 | 4/2007 | Mulvey |
| 7,215,941 B2 | 5/2007 | Beckmann |
| 7,228,276 B2 | 6/2007 | Omote |
| 7,231,343 B1 | 6/2007 | Treadgold |
| 7,236,923 B1 | 6/2007 | Gupta |
| 7,254,482 B2 | 8/2007 | Kawasaki |
| 7,272,212 B2 | 9/2007 | Eberle |
| 7,277,854 B2 | 10/2007 | Bennett |
| 7,283,829 B2 | 10/2007 | Christenson |
| 7,283,951 B2 | 10/2007 | Marchisio |
| 7,289,606 B2 | 10/2007 | Sibal |
| 7,299,186 B2 | 11/2007 | Kuzunuki |
| 7,301,093 B2 | 11/2007 | Sater |
| 7,305,381 B1 | 12/2007 | Poppink |
| 7,321,850 B2 | 1/2008 | Wakita |
| 7,328,155 B2 | 2/2008 | Endo |
| 7,337,116 B2 | 2/2008 | Charlesworth |
| 7,340,040 B1 | 3/2008 | Saylor |
| 7,366,285 B2 | 4/2008 | Parolkar |
| 7,366,669 B2 | 4/2008 | Nishitani |
| 7,376,645 B2 | 5/2008 | Bernard |
| 7,380,250 B2 | 5/2008 | Schechter |
| 7,386,443 B1 | 6/2008 | Parthasarathy |
| 7,398,209 B2 | 7/2008 | Kennewick |
| 7,406,421 B2 | 7/2008 | Odinak |
| 7,415,100 B2 | 8/2008 | Cooper |
| 7,415,414 B2 | 8/2008 | Azara |
| 7,421,393 B1 | 9/2008 | DiFabbrizio |
| 7,424,431 B2 | 9/2008 | Greene |
| 7,447,635 B1 | 11/2008 | Konopka |
| 7,451,088 B1 | 11/2008 | Ehlen |
| 7,454,368 B2 | 11/2008 | Stillman |
| 7,454,608 B2 | 11/2008 | Gopalakrishnan |
| 7,461,059 B2 | 12/2008 | Richardson |
| 7,472,020 B2 | 12/2008 | Brulle-Drews |
| 7,472,060 B1 | 12/2008 | Gorin |
| 7,472,075 B2 | 12/2008 | Odinak |
| 7,477,909 B2 | 1/2009 | Roth |
| 7,478,036 B2 | 1/2009 | Shen |
| 7,487,088 B1 | 2/2009 | Gorin |
| 7,487,110 B2 | 2/2009 | Bennett |
| 7,493,259 B2 | 2/2009 | Jones |
| 7,493,559 B1 | 2/2009 | Wolff |
| 7,502,672 B1 | 3/2009 | Kolls |
| 7,502,730 B2 | 3/2009 | Wang |
| 7,502,738 B2 | 3/2009 | Kennewick |
| 7,512,906 B1 | 3/2009 | Baier |
| 7,516,076 B2 | 4/2009 | Walker |
| 7,529,675 B2 | 5/2009 | Maes |
| 7,536,297 B2 | 5/2009 | Byrd |
| 7,536,374 B2 | 5/2009 | Au |
| 7,542,894 B2 | 6/2009 | Murata |
| 7,546,382 B2 | 6/2009 | Healey |
| 7,548,491 B2 | 6/2009 | Macfarlane |
| 7,552,054 B1 | 6/2009 | Stifelman |
| 7,558,730 B2 | 7/2009 | Davis |
| 7,574,362 B2 | 8/2009 | Walker |
| 7,577,244 B2 | 8/2009 | Taschereau |
| 7,606,708 B2 | 10/2009 | Hwang |
| 7,606,712 B1 | 10/2009 | Smith |
| 7,620,549 B2 | 11/2009 | DiCristo |
| 7,634,409 B2 | 12/2009 | Kennewick |
| 7,640,006 B2 | 12/2009 | Portman |
| 7,640,160 B2 | 12/2009 | DiCristo |
| 7,640,272 B2 | 12/2009 | Mahajan |

(56) References Cited

U.S. PATENT DOCUMENTS

| | | |
|---|---|---|
| 7,672,931 B2 | 3/2010 | Hurst-Hiller |
| 7,676,365 B2 | 3/2010 | Hwang |
| 7,676,369 B2 | 3/2010 | Fujimoto |
| 7,684,977 B2 | 3/2010 | Morikawa |
| 7,693,720 B2 | 4/2010 | Kennewick |
| 7,697,673 B2 | 4/2010 | Chiu |
| 7,706,616 B2 | 4/2010 | Kristensson |
| 7,729,913 B1 | 6/2010 | Lee |
| 7,729,916 B2 | 6/2010 | Coffman |
| 7,729,918 B2 | 6/2010 | Walker |
| 7,729,920 B2 | 6/2010 | Chaar |
| 7,734,287 B2 | 6/2010 | Ying |
| 7,748,021 B2 | 6/2010 | Obradovich |
| 7,788,084 B2 | 8/2010 | Brun |
| 7,792,257 B1 | 9/2010 | Vanier |
| 7,801,731 B2 | 9/2010 | Odinak |
| 7,809,570 B2 | 10/2010 | Kennewick |
| 7,818,176 B2 | 10/2010 | Freeman |
| 7,831,426 B2 | 11/2010 | Bennett |
| 7,831,433 B1 | 11/2010 | Belvin |
| 7,856,358 B2 | 12/2010 | Ho |
| 7,873,519 B2 | 1/2011 | Bennett |
| 7,873,523 B2 | 1/2011 | Potter |
| 7,873,654 B2 | 1/2011 | Bernard |
| 7,881,936 B2 | 2/2011 | Longe |
| 7,890,324 B2 | 2/2011 | Bangalore |
| 7,894,849 B2 | 2/2011 | Kass |
| 7,902,969 B2 | 3/2011 | Obradovich |
| 7,917,367 B2 | 3/2011 | DiCristo |
| 7,920,682 B2 | 4/2011 | Byrne |
| 7,949,529 B2 | 5/2011 | Weider |
| 7,949,537 B2 | 5/2011 | Walker |
| 7,953,732 B2 | 5/2011 | Frank |
| 7,974,875 B1 | 7/2011 | Quilici |
| 7,983,917 B2 | 7/2011 | Kennewick |
| 7,984,287 B2 | 7/2011 | Gopalakrishnan |
| 8,005,683 B2 | 8/2011 | Tessel |
| 8,015,006 B2 | 9/2011 | Kennewick |
| 8,024,186 B1 | 9/2011 | De Bonet |
| 8,027,965 B2 | 9/2011 | Takehara |
| 8,032,383 B1 | 10/2011 | Bhardwaj |
| 8,060,367 B2 | 11/2011 | Keaveney |
| 8,069,046 B2 | 11/2011 | Kennewick |
| 8,073,681 B2 | 12/2011 | Baldwin |
| 8,077,975 B2 | 12/2011 | Ma |
| 8,082,153 B2 | 12/2011 | Coffman |
| 8,086,463 B2 | 12/2011 | Ativanichayaphong |
| 8,103,510 B2 | 1/2012 | Sato |
| 8,112,275 B2 | 2/2012 | Kennewick |
| 8,140,327 B2 | 3/2012 | Kennewick |
| 8,140,335 B2 | 3/2012 | Kennewick |
| 8,145,489 B2 | 3/2012 | Freeman |
| 8,150,694 B2 | 4/2012 | Kennewick |
| 8,155,962 B2 | 4/2012 | Kennewick |
| 8,170,867 B2 | 5/2012 | Germain |
| 8,180,037 B1 | 5/2012 | Delker |
| 8,190,436 B2 * | 5/2012 | Bangalore ......... G10L 15/1822 704/270.1 |
| 8,195,468 B2 | 6/2012 | Weider |
| 8,200,485 B1 | 6/2012 | Lee |
| 8,204,751 B1 | 6/2012 | Di Fabbrizio |
| 8,219,399 B2 | 7/2012 | Lutz |
| 8,219,599 B2 | 7/2012 | Tunstall-Pedoe |
| 8,224,652 B2 | 7/2012 | Wang |
| 8,255,224 B2 | 8/2012 | Singleton |
| 8,326,599 B2 | 12/2012 | Tomeh |
| 8,326,627 B2 | 12/2012 | Kennewick |
| 8,326,634 B2 | 12/2012 | DiCristo |
| 8,326,637 B2 | 12/2012 | Baldwin |
| 8,332,224 B2 | 12/2012 | DiCristo |
| 8,340,975 B1 | 12/2012 | Rosenberger |
| 8,346,563 B1 | 1/2013 | Hjelm |
| 8,370,147 B2 | 2/2013 | Kennewick |
| 8,447,607 B2 | 5/2013 | Weider |
| 8,447,651 B1 | 5/2013 | Scholl |
| 8,452,598 B2 | 5/2013 | Kennewick |
| 8,503,995 B2 | 8/2013 | Ramer |
| 8,509,403 B2 | 8/2013 | Chiu |
| 8,515,765 B2 | 8/2013 | Baldwin |
| 8,527,274 B2 | 9/2013 | Freeman |
| 8,577,671 B1 | 11/2013 | Barve |
| 8,589,161 B2 | 11/2013 | Kennewick |
| 8,612,205 B2 | 12/2013 | Hanneman |
| 8,612,206 B2 | 12/2013 | Chalabi |
| 8,620,659 B2 | 12/2013 | DiCristo |
| 8,719,005 B1 | 5/2014 | Lee |
| 8,719,009 B2 | 5/2014 | Baldwin |
| 8,719,026 B2 | 5/2014 | Kennewick |
| 8,731,929 B2 | 5/2014 | Kennewick |
| 8,738,380 B2 | 5/2014 | Baldwin |
| 8,849,652 B2 | 9/2014 | Weider |
| 8,849,670 B2 | 9/2014 | DiCristo |
| 8,849,696 B2 | 9/2014 | Pansari |
| 8,849,791 B1 | 9/2014 | Hertschuh |
| 8,886,536 B2 | 11/2014 | Freeman |
| 8,972,243 B1 | 3/2015 | Strom |
| 8,983,839 B2 | 3/2015 | Kennewick |
| 9,009,046 B1 | 4/2015 | Stewart |
| 9,015,049 B2 | 4/2015 | Baldwin |
| 9,037,455 B1 | 5/2015 | Faaborg |
| 9,070,366 B1 | 6/2015 | Mathias |
| 9,070,367 B1 | 6/2015 | Hoffmeister |
| 9,105,266 B2 | 8/2015 | Baldwin |
| 9,171,541 B2 | 10/2015 | Kennewick |
| 9,269,097 B2 | 2/2016 | Freeman |
| 9,305,548 B2 | 4/2016 | Kennewick |
| 9,308,445 B1 | 4/2016 | Merzenich |
| 9,318,108 B2 | 4/2016 | Gruber |
| 9,406,078 B2 | 8/2016 | Freeman |
| 9,443,514 B1 | 9/2016 | Taubman |
| 9,502,025 B2 | 11/2016 | Mike Kennewick |
| 9,711,143 B2 | 7/2017 | Kennewick |
| 10,089,984 B2 * | 10/2018 | Kennewick ......... G10L 15/1822 |
| 2001/0021905 A1 | 9/2001 | Burnett |
| 2001/0039492 A1 | 11/2001 | Nemoto |
| 2001/0041980 A1 | 11/2001 | Howard |
| 2001/0047261 A1 | 11/2001 | Kassan |
| 2001/0049601 A1 | 12/2001 | Kroeker |
| 2001/0054087 A1 | 12/2001 | Flom |
| 2002/0002548 A1 | 1/2002 | Roundtree |
| 2002/0007267 A1 | 1/2002 | Batchilo |
| 2002/0010584 A1 | 1/2002 | Schultz |
| 2002/0015500 A1 | 2/2002 | Belt |
| 2002/0022927 A1 | 2/2002 | Lemelson |
| 2002/0022956 A1 | 2/2002 | Ukrainczyk |
| 2002/0029186 A1 | 3/2002 | Roth |
| 2002/0029261 A1 | 3/2002 | Shibata |
| 2002/0032752 A1 | 3/2002 | Gold |
| 2002/0035501 A1 | 3/2002 | Handel |
| 2002/0040297 A1 | 4/2002 | Tsiao |
| 2002/0049535 A1 | 4/2002 | Rigo |
| 2002/0049805 A1 | 4/2002 | Yamada |
| 2002/0059068 A1 | 5/2002 | Rose |
| 2002/0065568 A1 | 5/2002 | Silfvast |
| 2002/0067839 A1 | 6/2002 | Heinrich |
| 2002/0069059 A1 | 6/2002 | Smith |
| 2002/0069071 A1 | 6/2002 | Knockeart |
| 2002/0073176 A1 | 6/2002 | Ikeda |
| 2002/0082911 A1 | 6/2002 | Dunn |
| 2002/0087312 A1 | 7/2002 | Lee |
| 2002/0087326 A1 | 7/2002 | Lee |
| 2002/0087525 A1 | 7/2002 | Abbott |
| 2002/0107694 A1 | 8/2002 | Lerg |
| 2002/0120609 A1 | 8/2002 | Lang |
| 2002/0124050 A1 | 9/2002 | Middeljans |
| 2002/0133347 A1 | 9/2002 | Schoneburg |
| 2002/0133354 A1 | 9/2002 | Ross |
| 2002/0133402 A1 | 9/2002 | Faber |
| 2002/0135618 A1 | 9/2002 | Maes |
| 2002/0138248 A1 | 9/2002 | Corston-Oliver |
| 2002/0143532 A1 | 10/2002 | McLean |
| 2002/0143535 A1 | 10/2002 | Kist |
| 2002/0152260 A1 | 10/2002 | Chen |
| 2002/0161646 A1 | 10/2002 | Gailey |

(56) References Cited

U.S. PATENT DOCUMENTS

| | | |
|---|---|---|
| 2002/0161647 A1 | 10/2002 | Gailey |
| 2002/0169597 A1 | 11/2002 | Fain |
| 2002/0173333 A1 | 11/2002 | Buchholz |
| 2002/0173961 A1 | 11/2002 | Guerra |
| 2002/0178003 A1 | 11/2002 | Gehrke |
| 2002/0184373 A1 | 12/2002 | Maes |
| 2002/0188455 A1 | 12/2002 | Shioda |
| 2002/0188602 A1 | 12/2002 | Stubler |
| 2002/0198714 A1 | 12/2002 | Zhou |
| 2003/0005033 A1 | 1/2003 | Mohan |
| 2003/0014261 A1 | 1/2003 | Kageyama |
| 2003/0016835 A1 | 1/2003 | Elko |
| 2003/0036903 A1 | 2/2003 | Konopka |
| 2003/0046071 A1 | 3/2003 | Wyman |
| 2003/0046281 A1 | 3/2003 | Son |
| 2003/0046346 A1 | 3/2003 | Mumick |
| 2003/0064709 A1 | 4/2003 | Gailey |
| 2003/0065427 A1 | 4/2003 | Funk |
| 2003/0069734 A1 | 4/2003 | Everhart |
| 2003/0069880 A1 | 4/2003 | Harrison |
| 2003/0088421 A1 | 5/2003 | Maes |
| 2003/0093419 A1 | 5/2003 | Bangalore |
| 2003/0097249 A1 | 5/2003 | Walker |
| 2003/0110037 A1 | 6/2003 | Walker |
| 2003/0112267 A1 | 6/2003 | Belrose |
| 2003/0115062 A1 | 6/2003 | Walker |
| 2003/0120493 A1 | 6/2003 | Gupta |
| 2003/0135488 A1 | 7/2003 | Amir |
| 2003/0144846 A1 | 7/2003 | Denenberg |
| 2003/0158731 A1 | 8/2003 | Falcon |
| 2003/0161448 A1 | 8/2003 | Parolkar |
| 2003/0167167 A1 | 9/2003 | Gong |
| 2003/0174155 A1 | 9/2003 | Weng |
| 2003/0182132 A1 | 9/2003 | Niemoeller |
| 2003/0187643 A1 | 10/2003 | VanThong |
| 2003/0204492 A1 | 10/2003 | Wolf |
| 2003/0206640 A1 | 11/2003 | Malvar |
| 2003/0212550 A1 | 11/2003 | Ubale |
| 2003/0212558 A1 | 11/2003 | Matula |
| 2003/0212562 A1 | 11/2003 | Patel |
| 2003/0225825 A1 | 12/2003 | Healey |
| 2003/0233230 A1 | 12/2003 | Ammicht |
| 2003/0236664 A1 | 12/2003 | Sharma |
| 2004/0006475 A1 | 1/2004 | Ehlen |
| 2004/0010358 A1 | 1/2004 | Oesterling |
| 2004/0025115 A1 | 2/2004 | Sienel |
| 2004/0030741 A1 | 2/2004 | Wolton |
| 2004/0036601 A1 | 2/2004 | Obradovich |
| 2004/0044516 A1 | 3/2004 | Kennewick |
| 2004/0093567 A1 | 5/2004 | Schabes |
| 2004/0098245 A1 | 5/2004 | Walker |
| 2004/0102977 A1 | 5/2004 | Metzler |
| 2004/0117179 A1 | 6/2004 | Balasuriya |
| 2004/0117804 A1 | 6/2004 | Scahill |
| 2004/0122673 A1 | 6/2004 | Park |
| 2004/0122674 A1 | 6/2004 | Bangalore |
| 2004/0133793 A1 | 7/2004 | Ginter |
| 2004/0140989 A1 | 7/2004 | Papageorge |
| 2004/0143440 A1 | 7/2004 | Prasad |
| 2004/0148154 A1 | 7/2004 | Acero |
| 2004/0148170 A1 | 7/2004 | Acero |
| 2004/0158555 A1 | 8/2004 | Seedman |
| 2004/0166832 A1 | 8/2004 | Portman |
| 2004/0167771 A1 | 8/2004 | Duan |
| 2004/0172247 A1 | 9/2004 | Yoon |
| 2004/0172258 A1 | 9/2004 | Dominach |
| 2004/0189697 A1 | 9/2004 | Fukuoka |
| 2004/0193408 A1 | 9/2004 | Hunt |
| 2004/0193420 A1 | 9/2004 | Kennewick |
| 2004/0199375 A1 | 10/2004 | Ehsani |
| 2004/0199389 A1 | 10/2004 | Geiger |
| 2004/0201607 A1 | 10/2004 | Mulvey |
| 2004/0204939 A1 | 10/2004 | Liu |
| 2004/0205671 A1 | 10/2004 | Sukehiro |
| 2004/0220800 A1 | 11/2004 | Kong |
| 2004/0243393 A1 | 12/2004 | Wang |
| 2004/0243417 A9 | 12/2004 | Pitts |
| 2004/0247092 A1 | 12/2004 | Timmins |
| 2004/0249636 A1 | 12/2004 | Applebaum |
| 2005/0015256 A1 | 1/2005 | Kargman |
| 2005/0021331 A1 | 1/2005 | Huang |
| 2005/0021334 A1 | 1/2005 | Iwahashi |
| 2005/0021470 A1 | 1/2005 | Martin |
| 2005/0021826 A1 | 1/2005 | Kumar |
| 2005/0033574 A1 | 2/2005 | Kim |
| 2005/0033582 A1 | 2/2005 | Gadd |
| 2005/0043940 A1 | 2/2005 | Elder |
| 2005/0060142 A1 | 3/2005 | Visser |
| 2005/0080632 A1 | 4/2005 | Endo |
| 2005/0102282 A1 | 5/2005 | Linden |
| 2005/0114116 A1 | 5/2005 | Fiedler |
| 2005/0125232 A1 | 6/2005 | Gadd |
| 2005/0131673 A1 | 6/2005 | Koizumi |
| 2005/0137850 A1 | 6/2005 | Odell |
| 2005/0137877 A1 | 6/2005 | Oesterling |
| 2005/0143994 A1 | 6/2005 | Mori |
| 2005/0144013 A1 | 6/2005 | Fujimoto |
| 2005/0144187 A1 | 6/2005 | Che |
| 2005/0149319 A1 | 7/2005 | Honda |
| 2005/0169441 A1 | 8/2005 | Yacoub |
| 2005/0216254 A1 | 9/2005 | Gupta |
| 2005/0222763 A1 | 10/2005 | Uyeki |
| 2005/0234637 A1 | 10/2005 | Obradovich |
| 2005/0234727 A1 | 10/2005 | Chiu |
| 2005/0246174 A1 | 11/2005 | DeGolia |
| 2005/0283364 A1 | 12/2005 | Longe |
| 2005/0283532 A1 | 12/2005 | Kim |
| 2005/0283752 A1 | 12/2005 | Fruchter |
| 2006/0041431 A1 | 2/2006 | Maes |
| 2006/0046740 A1 | 3/2006 | Johnson |
| 2006/0047509 A1 | 3/2006 | Ding |
| 2006/0072738 A1 | 4/2006 | Louis |
| 2006/0074670 A1 | 4/2006 | Weng |
| 2006/0074671 A1 | 4/2006 | Farmaner |
| 2006/0080098 A1 | 4/2006 | Campbell |
| 2006/0100851 A1 | 5/2006 | Schonebeck |
| 2006/0106769 A1 | 5/2006 | Gibbs |
| 2006/0129409 A1 | 6/2006 | Mizutani |
| 2006/0130002 A1 | 6/2006 | Hirayama |
| 2006/0182085 A1 | 8/2006 | Sweeney |
| 2006/0206310 A1 | 9/2006 | Ravikumar |
| 2006/0217133 A1 | 9/2006 | Christenson |
| 2006/0236343 A1 | 10/2006 | Chang |
| 2006/0242017 A1 | 10/2006 | Libes |
| 2006/0253247 A1 | 11/2006 | de Silva |
| 2006/0253281 A1 | 11/2006 | Letzt |
| 2006/0285662 A1 | 12/2006 | Yin |
| 2007/0011159 A1 | 1/2007 | Hillis |
| 2007/0033005 A1 | 2/2007 | Di Cristo |
| 2007/0033020 A1 | 2/2007 | Francois |
| 2007/0033526 A1 | 2/2007 | Thompson |
| 2007/0038436 A1 | 2/2007 | Cristo |
| 2007/0038445 A1 | 2/2007 | Helbing |
| 2007/0043569 A1 | 2/2007 | Potter |
| 2007/0043574 A1 | 2/2007 | Coffman |
| 2007/0043868 A1 | 2/2007 | Kumar |
| 2007/0050191 A1 | 3/2007 | Weider |
| 2007/0050279 A1 | 3/2007 | Huang |
| 2007/0055525 A1 | 3/2007 | Kennewick |
| 2007/0060114 A1 | 3/2007 | Ramer |
| 2007/0061067 A1 | 3/2007 | Zeinstra |
| 2007/0061735 A1 | 3/2007 | Hoffberg |
| 2007/0067310 A1 | 3/2007 | Gupta |
| 2007/0073544 A1 | 3/2007 | Millett |
| 2007/0078708 A1 | 4/2007 | Yu |
| 2007/0078709 A1 | 4/2007 | Rajaram |
| 2007/0078814 A1 | 4/2007 | Flowers |
| 2007/0094003 A1 | 4/2007 | Huang |
| 2007/0100797 A1 | 5/2007 | Thun |
| 2007/0106499 A1 | 5/2007 | Dahlgren |
| 2007/0112555 A1 | 5/2007 | Lavi |
| 2007/0112630 A1 | 5/2007 | Lau |
| 2007/0118357 A1 | 5/2007 | Kasravi |
| 2007/0124057 A1 | 5/2007 | Prieto |

(56) References Cited

U.S. PATENT DOCUMENTS

| | | |
|---|---|---|
| 2007/0135101 A1 | 6/2007 | Ramati |
| 2007/0146833 A1 | 6/2007 | Satomi |
| 2007/0162296 A1 | 7/2007 | Altberg |
| 2007/0174258 A1 | 7/2007 | Jones |
| 2007/0179778 A1 | 8/2007 | Gong |
| 2007/0185859 A1 | 8/2007 | Flowers |
| 2007/0186165 A1 | 8/2007 | Maislos |
| 2007/0192309 A1 | 8/2007 | Fischer |
| 2007/0198267 A1 | 8/2007 | Jones |
| 2007/0203699 A1 | 8/2007 | Nagashima |
| 2007/0203736 A1 | 8/2007 | Ashton |
| 2007/0208732 A1 | 9/2007 | Flowers |
| 2007/0214182 A1 | 9/2007 | Rosenberg |
| 2007/0250901 A1 | 10/2007 | McIntire |
| 2007/0265850 A1 | 11/2007 | Kennewick |
| 2007/0266257 A1 | 11/2007 | Camaisa |
| 2007/0276651 A1 | 11/2007 | Bliss |
| 2007/0294615 A1 | 12/2007 | Sathe |
| 2007/0299824 A1 | 12/2007 | Pan |
| 2008/0014908 A1 | 1/2008 | Vasant |
| 2008/0034032 A1 | 2/2008 | Healey |
| 2008/0046311 A1 | 2/2008 | Shahine |
| 2008/0059188 A1 | 3/2008 | Konopka |
| 2008/0065386 A1 | 3/2008 | Cross |
| 2008/0065389 A1 | 3/2008 | Cross |
| 2008/0065390 A1 | 3/2008 | Ativanichayaphong |
| 2008/0086455 A1 | 4/2008 | Meisels |
| 2008/0091406 A1 | 4/2008 | Baldwin |
| 2008/0103761 A1 | 5/2008 | Printz |
| 2008/0103781 A1 | 5/2008 | Wasson |
| 2008/0104071 A1 | 5/2008 | Pragada |
| 2008/0109285 A1 | 5/2008 | Reuther |
| 2008/0115163 A1 | 5/2008 | Gilboa |
| 2008/0126091 A1 | 5/2008 | Clark |
| 2008/0126284 A1 | 5/2008 | Forbes |
| 2008/0133215 A1 | 6/2008 | Sarukkai |
| 2008/0140385 A1 | 6/2008 | Mahajan |
| 2008/0147396 A1 | 6/2008 | Wang |
| 2008/0147410 A1 | 6/2008 | Odinak |
| 2008/0147637 A1 | 6/2008 | Li |
| 2008/0154604 A1 | 6/2008 | Sathish |
| 2008/0162471 A1 | 7/2008 | Bernard |
| 2008/0177530 A1 | 7/2008 | Cross |
| 2008/0184164 A1 | 7/2008 | Di Fabbrizio |
| 2008/0189110 A1 | 8/2008 | Freeman |
| 2008/0189187 A1 | 8/2008 | Hao |
| 2008/0228496 A1 | 9/2008 | Yu |
| 2008/0235023 A1 | 9/2008 | Kennewick |
| 2008/0235027 A1 | 9/2008 | Cross |
| 2008/0269958 A1 | 10/2008 | Filev |
| 2008/0270135 A1 | 10/2008 | Goel |
| 2008/0270224 A1 | 10/2008 | Portman |
| 2008/0294437 A1 | 11/2008 | Nakano |
| 2008/0294994 A1 | 11/2008 | Kruger |
| 2008/0306743 A1 | 12/2008 | Di Fabbrizio |
| 2008/0319751 A1 | 12/2008 | Kennewick |
| 2009/0006077 A1 | 1/2009 | Keaveney |
| 2009/0006194 A1 | 1/2009 | Sridharan |
| 2009/0018829 A1 | 1/2009 | Kuperstein |
| 2009/0024476 A1 | 1/2009 | Baar |
| 2009/0030686 A1 | 1/2009 | Weng |
| 2009/0052635 A1 | 2/2009 | Jones |
| 2009/0055176 A1 | 2/2009 | Hu |
| 2009/0067599 A1 | 3/2009 | Agarwal |
| 2009/0076827 A1 | 3/2009 | Bulitta |
| 2009/0106029 A1 | 4/2009 | DeLine |
| 2009/0117885 A1 | 5/2009 | Roth |
| 2009/0144131 A1 | 6/2009 | Chiu |
| 2009/0144271 A1 | 6/2009 | Richardson |
| 2009/0150156 A1 | 6/2009 | Kennewick |
| 2009/0157382 A1 | 6/2009 | Bar |
| 2009/0164216 A1 | 6/2009 | Chengalvarayan |
| 2009/0171664 A1 | 7/2009 | Kennewick |
| 2009/0171912 A1 | 7/2009 | Nash |
| 2009/0197582 A1 | 8/2009 | Lewis |
| 2009/0216540 A1 | 8/2009 | Tessel |
| 2009/0248565 A1 | 10/2009 | Chuang |
| 2009/0248605 A1 | 10/2009 | Mitchell |
| 2009/0259561 A1 | 10/2009 | Boys |
| 2009/0259646 A1 | 10/2009 | Fujita |
| 2009/0265163 A1 | 10/2009 | Li |
| 2009/0271194 A1 | 10/2009 | Davis |
| 2009/0273563 A1 | 11/2009 | Pryor |
| 2009/0276700 A1 | 11/2009 | Anderson |
| 2009/0287680 A1 | 11/2009 | Paek |
| 2009/0299745 A1 | 12/2009 | Kennewick |
| 2009/0299857 A1 | 12/2009 | Brubaker |
| 2009/0304161 A1 | 12/2009 | Pettyjohn |
| 2009/0307031 A1 | 12/2009 | Winkler |
| 2009/0313026 A1 | 12/2009 | Coffman |
| 2009/0319517 A1 | 12/2009 | Guha |
| 2010/0023320 A1 | 1/2010 | Cristo |
| 2010/0023331 A1 | 1/2010 | Duta |
| 2010/0029261 A1 | 2/2010 | Mikkelsen |
| 2010/0036967 A1 | 2/2010 | Caine |
| 2010/0049501 A1 | 2/2010 | Kennewick |
| 2010/0049514 A1 | 2/2010 | Kennewick |
| 2010/0057443 A1 | 3/2010 | Cristo |
| 2010/0063880 A1 | 3/2010 | Atsmon |
| 2010/0064025 A1 | 3/2010 | Nelimarkka |
| 2010/0094707 A1 | 4/2010 | Freer |
| 2010/0138300 A1 | 6/2010 | Wallis |
| 2010/0145700 A1 | 6/2010 | Kennewick |
| 2010/0185512 A1 | 7/2010 | Borger |
| 2010/0191856 A1 | 7/2010 | Gupta |
| 2010/0204986 A1 | 8/2010 | Kennewick |
| 2010/0204994 A1 | 8/2010 | Kennewick |
| 2010/0217604 A1 | 8/2010 | Baldwin |
| 2010/0268536 A1 | 10/2010 | Suendermann |
| 2010/0286985 A1 | 11/2010 | Kennewick |
| 2010/0299142 A1 | 11/2010 | Freeman |
| 2010/0312547 A1 | 12/2010 | Van Os |
| 2010/0312566 A1 | 12/2010 | Odinak |
| 2010/0318357 A1 | 12/2010 | Istvan |
| 2010/0331064 A1 | 12/2010 | Michelstein |
| 2011/0022393 A1 | 1/2011 | Waller |
| 2011/0106527 A1 | 5/2011 | Chiu |
| 2011/0112827 A1 | 5/2011 | Kennewick |
| 2011/0112921 A1 | 5/2011 | Kennewick |
| 2011/0119049 A1 | 5/2011 | Ylonen |
| 2011/0131036 A1 | 6/2011 | DiCristo |
| 2011/0131045 A1 | 6/2011 | Cristo |
| 2011/0231182 A1 | 9/2011 | Weider |
| 2011/0231188 A1 | 9/2011 | Kennewick |
| 2011/0238409 A1 | 9/2011 | Larcheveque |
| 2011/0307167 A1 | 12/2011 | Taschereau |
| 2012/0022857 A1 | 1/2012 | Baldwin |
| 2012/0041753 A1 | 2/2012 | Dymetman |
| 2012/0046935 A1 | 2/2012 | Nagao |
| 2012/0101809 A1 | 4/2012 | Kennewick |
| 2012/0101810 A1 | 4/2012 | Kennewick |
| 2012/0109753 A1 | 5/2012 | Kennewick |
| 2012/0150620 A1 | 6/2012 | Mandyam |
| 2012/0150636 A1 | 6/2012 | Freeman |
| 2012/0239498 A1 | 9/2012 | Ramer |
| 2012/0240060 A1 | 9/2012 | Pennington |
| 2012/0265528 A1 | 10/2012 | Gruber |
| 2012/0278073 A1 | 11/2012 | Weider |
| 2013/0006734 A1 | 1/2013 | Ocko |
| 2013/0054228 A1 | 2/2013 | Baldwin |
| 2013/0060625 A1 | 3/2013 | Davis |
| 2013/0080177 A1 | 3/2013 | Chen |
| 2013/0211710 A1 | 8/2013 | Kennewick |
| 2013/0253929 A1 | 9/2013 | Weider |
| 2013/0254314 A1 | 9/2013 | Chow |
| 2013/0297293 A1 | 11/2013 | Cristo |
| 2013/0304473 A1 | 11/2013 | Baldwin |
| 2013/0311324 A1 | 11/2013 | Stoll |
| 2013/0332454 A1 | 12/2013 | Stuhec |
| 2013/0339022 A1 | 12/2013 | Baldwin |
| 2014/0006951 A1 | 1/2014 | Hunter |
| 2014/0012577 A1 | 1/2014 | Freeman |
| 2014/0025371 A1 | 1/2014 | Min |
| 2014/0108013 A1 | 4/2014 | Cristo |

(56) References Cited

U.S. PATENT DOCUMENTS

| | | |
|---|---|---|
| 2014/0136187 A1 | 5/2014 | Wolverton |
| 2014/0156278 A1 | 6/2014 | Kennewick |
| 2014/0195238 A1 | 7/2014 | Terao |
| 2014/0236575 A1 | 8/2014 | Tur |
| 2014/0249821 A1 | 9/2014 | Kennewick |
| 2014/0249822 A1 | 9/2014 | Baldwin |
| 2014/0278413 A1 | 9/2014 | Pitschel |
| 2014/0278416 A1 | 9/2014 | Schuster |
| 2014/0288934 A1 | 9/2014 | Kennewick |
| 2014/0330552 A1 | 11/2014 | Bangalore |
| 2014/0337007 A1 | 11/2014 | Waibel |
| 2014/0365222 A1 | 12/2014 | Weider |
| 2015/0019211 A1 | 1/2015 | Simard |
| 2015/0019217 A1 | 1/2015 | Cristo |
| 2015/0019227 A1 | 1/2015 | Anandarajah |
| 2015/0066479 A1 | 3/2015 | Pasupalak |
| 2015/0066627 A1 | 3/2015 | Freeman |
| 2015/0073910 A1 | 3/2015 | Kennewick |
| 2015/0095159 A1 | 4/2015 | Kennewick |
| 2015/0142447 A1 | 5/2015 | Kennewick |
| 2015/0170641 A1 | 6/2015 | Kennewick |
| 2015/0193379 A1 | 7/2015 | Mehta |
| 2015/0199339 A1 | 7/2015 | Mirkin |
| 2015/0228276 A1 | 8/2015 | Baldwin |
| 2015/0293917 A1 | 10/2015 | Bufe |
| 2015/0348544 A1 | 12/2015 | Baldwin |
| 2015/0348551 A1 | 12/2015 | Gruber |
| 2015/0364133 A1 | 12/2015 | Freeman |
| 2016/0049152 A1 | 2/2016 | Kennewick |
| 2016/0078482 A1 | 3/2016 | Kennewick |
| 2016/0078491 A1 | 3/2016 | Kennewick |
| 2016/0078504 A1 | 3/2016 | Kennewick |
| 2016/0078773 A1 | 3/2016 | Carter |
| 2016/0110347 A1 | 4/2016 | Kennewick |
| 2016/0148610 A1 | 5/2016 | Kennewick |
| 2016/0148612 A1 | 5/2016 | Guo |
| 2016/0188292 A1 | 6/2016 | Carter |
| 2016/0188573 A1 | 6/2016 | Tang |
| 2016/0217785 A1 | 7/2016 | Kennewick |
| 2016/0335676 A1 | 11/2016 | Freeman |

FOREIGN PATENT DOCUMENTS

| | | |
|---|---|---|
| CN | 102160043 | 4/2015 |
| EP | 1320043 A2 | 6/2003 |
| EP | 1646037 | 4/2006 |
| JP | H08263258 | 10/1996 |
| JP | H11249773 | 9/1999 |
| JP | 2001071289 | 3/2001 |
| JP | 2006146881 | 6/2006 |
| JP | 2008027454 | 2/2008 |
| JP | 2008058465 | 3/2008 |
| JP | 2008139928 | 6/2008 |
| JP | 2011504304 | 2/2011 |
| JP | 2012518847 | 8/2012 |
| WO | 9946763 | 9/1999 |
| WO | 0021232 | 4/2000 |
| WO | 0046792 | 8/2000 |
| WO | 0129742 | 4/2001 |
| WO | 0171609 A2 | 9/2001 |
| WO | 0178065 | 10/2001 |
| WO | 2004072954 | 8/2004 |
| WO | 2005010702 A2 | 2/2005 |
| WO | 2007019318 | 1/2007 |
| WO | 2007021587 | 1/2007 |
| WO | 2007027546 | 1/2007 |
| WO | 2007027989 | 1/2007 |
| WO | 2008098039 | 1/2008 |
| WO | 2008118195 | 1/2008 |
| WO | 2009075912 | 1/2009 |
| WO | 2009145796 | 1/2009 |
| WO | 2009111721 | 9/2009 |
| WO | 2010096752 | 1/2010 |
| WO | 2016044290 | 3/2016 |
| WO | 2016044316 | 3/2016 |
| WO | 2016044319 | 3/2016 |
| WO | 2016044321 | 3/2016 |
| WO | 2016061309 | 4/2016 |

OTHER PUBLICATIONS

Arrington, Michael, "Google Redefines GPS Navigation Landscape: Google Maps Navigation for Android 2.0", TechCrunch, printed from the Internet <http://www.techcrunch.com/2009/10/28/google-redefines-car-gps-navigation-google-maps-navigation-android/>, Oct. 28, 2009, 4 pages.

Bazzi, Issam et al., "Heterogeneous Lexical Units for Automatic Speech Recognition: Preliminary Investigations", Proceedings of the IEEE International Conference on Acoustics, Speech, and Signal Processing, vol. 3, Jun. 5-9, 2000, XP010507574, pp. 1257-1260.

Belvin, Robert, et al., "Development of the HRL Route Navigation Dialogue System", Proceedings of the First International Conference on Human Language Technology Research, San Diego, 2001, pp. 1-5.

Chai et al., "MIND: A Semantics-Based Multimodal Interpretation Framework for Conversational Systems", Proceedings of the International Class Workshop on Natural, Intelligent and Effective Interaction in Multimodal Dialogue Systems, Jun. 2002, pp. 37-46.

Cheyer et al., "Multimodal Maps: An Agent-Based Approach", International Conference on Cooperative Multimodal Communication (CMC/95), May 24-26, 1995, pp. 111-121.

Davis, Z., et al., A Personal Handheld Multi-Modal Shopping Assistant, IEEE, 2006, 9 pages.

El Meliani et al., "A Syllabic-Filler-Based Continuous Speech Recognizer for Unlimited Vocabulary", Canadian Conference on Electrical and Computer Engineering, vol. 2, Sep. 5-8, 1995, pp. 1007-1010.

Elio et al., "On Abstract Task Models and Conversation Policies" in Workshop on Specifying and Implementing Conversation Policies, Autonomous Agents '99, Seattle, 1999, 10 pages.

Kirchhoff, Katrin, "Syllable-Level Desynchronisation of Phonetic Features for Speech Recognition", Proceedings of the Fourth International Conference on Spoken Language, 1996, ICSLP 96, vol. 4, IEEE, 1996, 3 pages.

Kuhn, Thomas, et al., "Hybrid In-Car Speech Recognition for Mobile Multimedia Applications", Vehicular Technology Conference, IEEE, Jul. 1999, pp. 2009-2013.

Lin, Bor-shen, et al., "A Distributed Architecture for Cooperative Spoken Dialogue Agents with Coherent Dialogue State and History", ASRU'99, 1999, 4 pages.

Lind, R., et al., "The Network Vehicle—A Glimpse into the Future of Mobile Multi-Media", IEEE Aerosp. Electron. Systems Magazine, vol. 14, No. 9, Sep. 1999, pp. 27-32.

Mao, Mark Z., "Automatic Training Set Segmentation for Multi-Pass Speech Recognition", Department of Electrical Engineering, Stanford University, CA, copyright 2005, IEEE, pp. I-685 to I-688.

O'Shaughnessy, Douglas, "Interacting with Computers by Voice: Automatic Speech Recognition and Synthesis", Proceedings of the IEEE, vol. 91, No. 9, Sep. 1, 2003, XP011100665. pp. 1272-1305.

Reuters, "IBM to Enable Honda Drivers to Talk to Cars", Charles Schwab & Co., Inc., Jul. 28, 2002, 1 page.

Turunen, "Adaptive Interaction Methods in Speech User Interfaces", Conference on Human Factors in Computing Systems, Seattle, Washington, 2001, pp. 91-92.

Vanhoucke, Vincent, "Confidence Scoring and Rejection Using Multi-Pass Speech Recognition", Nuance Communications, Menlo Park, CA, 2005, 4 pages.

Weng, Fuliang, et al., "Efficient Lattice Representation and Generation", Speech Technology and Research Laboratory, SRI International, Menlo Park, CA, 1998, 4 pages.

Wu, Su-Lin, et al., "Incorporating Information from Syllable-Length Time Scales into Automatic Speech Recognition", Proceedings of the 1998 IEEE International Conference on Acoustics, Speech and Signal Processing, 1998, vol. 2 IEEE, 1998, 4 pages.

(56) References Cited

OTHER PUBLICATIONS

Wu, Su-Lin, et al., "Integrating Syllable Boundary Information into Speech Recognition", IEEE International Conference on Acoustics, Speech, and Signal Processing, ICASSP-97, 1997, vol. 2, IEEE, 1997, 4 pages.

Zhao, Yilin, "Telematics: Safe and Fun Driving", IEEE Intelligent Systems, vol. 17, Issue 1, 2002, pp. 10-14.

U.S. Appl. No. 12/127,343, "Final Office Action", dated Jul. 20, 2011, 15 pages.

U.S. Appl. No. 12/127,343, "Non-Final Office Action", dated Feb. 3, 2011, 13 pages.

U.S. Appl. No. 12/127,343, "Notice of Allowability", dated Jul. 11, 2013, 11 pages.

U.S. Appl. No. 12/127,343, "Notice of Allowance", dated Mar. 26, 2013, 12 pages.

U.S. Appl. No. 14/083,061, "Non-Final Office Action", dated Aug. 12, 2015, 12 pages.

U.S. Appl. No. 14/083,061, "Notice of Allowance", dated Dec. 10, 2015, 9 pages.

U.S. Appl. No. 15/090,215, "Non-Final Office Action", dated Nov. 23, 2016, 11 pages.

U.S. Appl. No. 15/090,215, "Notice of Allowance", dated Mar. 22, 2017, 9 pages.

U.S. Appl. No. 15/632,713, "Non-Final Office Action", dated Dec. 13, 2017, 8 pages.

U.S. Appl. No. 15/632,713, "Notice of Allowance", dated Jul. 11, 2018, 9 pages.

China Application No. CN200880130303.8, "Office Action", dated May 23, 2013, 25 pages.

European Application No. EP08781559.3, "Extended European Search Report", dated Aug. 6, 2012, 7 pages.

European Application No. EP08781559.3, "Office Action", dated Oct. 19, 2017, 5 pages.

International Application No. PCT/US2008/069524, "International Preliminary Report on Patentability", dated Nov. 30, 2010, 6 pages.

\* cited by examiner

Input Device

SYSTEM AND METHOD FOR AN INTEGRATED, MULTI-MODAL, MULTI-DEVICE NATURAL LANGUAGE VOICE SERVICES ENVIRONMENT

CROSS REFERENCE TO RELATED APPLICATIONS

This application (Ser. No. 16/142,227) is a continuation of U.S. patent application Ser. No. 15/632,713, entitled "SYSTEM AND METHOD FOR AN INTEGRATED, MULTI-MODAL, MULTI-DEVICE NATURAL LANGUAGE VOICE SERVICES ENVIRONMENT," filed Jun. 26, 2017 (which issued as U.S. Pat. No. 10,089,984 on Oct. 2, 2018), which is a continuation of U.S. patent application Ser. No. 15/090,215, entitled "SYSTEM AND METHOD FOR AN INTEGRATED, MULTI-MODAL, MULTI-DEVICE NATURAL LANGUAGE VOICE SERVICES ENVIRONMENT," filed Apr. 4, 2016 (which issued as U.S. Pat. No. 9,711,143 on Jul. 18, 2017), which is a continuation of U.S. patent application Ser. No. 14/083,061, entitled "SYSTEM AND METHOD FOR AN INTEGRATED, MULTI-MODAL, MULTI-DEVICE NATURAL LANGUAGE VOICE SERVICES ENVIRONMENT," filed Nov. 18, 2013 (which issued as U.S. Pat. No. 9,305,548 on Apr. 5, 2016), which is a continuation of U.S. patent application Ser. No. 12/127,343, entitled "SYSTEM AND METHOD FOR AN INTEGRATED, MULTI-MODAL, MULTI-DEVICE NATURAL LANGUAGE VOICE SERVICES ENVIRONMENT," filed May 27, 2008 (which issued as U.S. Pat. No. 8,589,161 on Nov. 19, 2013), the contents of which are hereby incorporated by reference in their entirety.

FIELD OF THE INVENTION

The invention relates to an integrated voice services environment in which a plurality of devices can provide various voice services by cooperatively processing free form, multi-modal, natural language inputs, thereby facilitating conversational interactions between a user and one or more of the devices in the integrated environment.

BACKGROUND OF THE INVENTION

As technology has progressed in recent years, consumer electronic devices have emerged to become nearly ubiquitous in the everyday lives of many people. To meet the increasing demand that has resulted from growth in the functionality and mobility of mobile phones, navigation devices, embedded devices, and other such devices, a wealth of features and functions are often provided therein in addition to core applications. Greater functionality also introduces the trade-offs, however, including learning curves that often inhibit users from fully exploiting all of the capabilities of their electronic devices. For example, many existing electronic devices include complex human to machine interfaces that may not be particularly user-friendly, which inhibits mass-market adoption for many technologies. Moreover, cumbersome interfaces often result in otherwise desirable features being buried (e.g., within menus that may be tedious to navigate), which has the tendency of causing many users to not use, or even know about, the potential capabilities of their devices.

As such, the increased functionality provided by many electronic devices often tends to be wasted, as market research suggests that many users only use only a fraction of the features or applications available on a given device. Moreover, in a society where wireless networking and broadband access are increasingly prevalent, consumers tend to naturally desire seamless mobile capabilities from their electronic devices. Thus, as consumer demand intensifies for simpler mechanisms to interact with electronic devices, cumbersome interfaces that prevent quick and focused interaction can become an important concern. Accordingly, the ever-growing demand for mechanisms to use technology in intuitive ways remains largely unfulfilled.

One approach towards simplifying human to machine interactions in electronic devices includes the use of voice recognition software, which can enable users to exploit features that could otherwise be unfamiliar, unknown, or difficult to use. For example, a recent survey conducted by the Navteq Corporation, which provides data used in a variety of applications such as automotive navigation and web-based applications, demonstrates that voice recognition often ranks among the features most desired by consumers of electronic devices. Even so, existing voice user interfaces, when they actually work, still tend to require significant learning on the part of the user.

For example, many existing voice user interface only support requests formulated according to specific command-and-control sequences or syntaxes. Furthermore, many existing voice user interfaces cause user frustration or dissatisfaction because of inaccurate speech recognition. Similarly, by forcing a user to provide pre-established commands or keywords to communicate requests in ways that a system can understand, existing voice user interfaces do not effectively engage the user in a productive, cooperative dialogue to resolve requests and advance a conversation towards a mutually satisfactory goal (e.g., when users may be uncertain of particular needs, available information, or device capabilities, among other things). As such, existing voice user interfaces tend to suffer from various drawbacks, including significant limitations on engaging users in a dialogue in a cooperative and conversational manner.

Additionally, many existing voice user interfaces fall short in utilizing information distributed across various different domains or devices in order to resolve natural language voice-based inputs. Thus, existing voice user interfaces suffer from being constrained to a finite set of applications for which they have been designed, or to devices on which they reside. Although technological advancement has resulted in users often having several devices to suit their various needs, existing voice user interfaces do not adequately free users from device constraints. For example, users may be interested in services associated with different applications and devices, but existing voice user interfaces tend to restrict users from accessing the applications and devices as they see fit. Moreover, users typically can only practicably carry a finite number of devices at any given time, yet content or services associated with users' other devices that currently being used may be desired in various circumstances. Accordingly, although users tend to have varying needs, where content or services associated with different devices may be desired in various contexts or environments, existing voice technologies tend to fall short in providing an integrated environment in which users can request content or services associated with virtually any device or network. As such, constraints on information availability and device interaction mechanisms in existing voice services environments tend to prevent users from experiencing technology in an intuitive, natural, and efficient way.

Existing systems suffer from these and other problems.

SUMMARY OF THE INVENTION

According to various aspects of the invention, a system and method for an integrated, multi-modal, multi-device natural language voice services environment may include a plurality of voice-enabled devices each having intent determination capabilities for processing multi-modal natural language inputs in addition to knowledge of the intent determination capabilities of other devices in the environment. Further, the environment may be arranged in a centralized manner, a distributed peer-to-peer manner, or various combinations thereof. As such, the various devices may cooperate to determine intent of multi-modal natural language inputs, and commands, queries, or other requests may be routed to one or more of the devices best suited to take action in response thereto.

According to various aspects of the invention, the integrated natural language voice services environment arranged in the centralized manner includes an input device that receives a multi-modal natural language input, a central device communicatively coupled to the input device, and one or more secondary devices communicatively coupled to the central device. Each of the input device, the central device, and the one or more secondary devices may have intent determination capabilities for processing multi-modal natural language inputs. As such, an intent of a given multi-modal natural language input may be determined in the centralized manner by communicating the multi-modal natural language input from the input device to the central device. Thereafter, the central device may aggregate the intent determination capabilities of the input device and the one or more secondary devices and determine an intent of the multi-modal natural language input using the aggregated intent determination capabilities. The input device may then receive the determined intent from the central device and invoke at least one action at one or more of the input device, the central device, or the secondary devices based on the determined intent.

According to various aspects of the invention, the integrated natural language voice services environment arranged in the distributed manner includes an input device that receives a multi-modal natural language input, a central device communicatively coupled to the input device and one or more secondary devices communicatively coupled to the input device, wherein each of the input device and the one or more secondary devices may have intent determination capabilities for processing multi-modal natural language inputs, as in the centralized implementation. However, the distributed implementation may be distinct from the centralized implementation in that a preliminary intent of the multi-modal natural language input may be determined at the input device using local intent determination capabilities. The multi-modal natural language input may then be communicated to one or more of the secondary devices (e.g., when a confidence level of the intent determination at the input device falls below a given threshold). In such cases, each of the secondary devices determine an intent of the multi-modal natural language input using local intent determination capabilities. The input device collates the preliminary intent determination and the intent determinations of the secondary devices, and may arbitrate among the collated intent determinations to determine an actionable intent of the multi-modal natural input.

According to various aspects of the invention, the integrated natural language voice services environment arranged in a manner that dynamically selects between a centralized model and a distributed model. For example, the environment includes an input device that receives a multi-modal natural language input one or more secondary devices communicatively coupled to the input device, each of which have intent determination capabilities for processing multi-modal natural language inputs. A constellation model may be accessible to each of the input device and the one or more secondary devices, wherein the constellation model describes the intent determination capabilities of the input device and the one or more secondary devices. The multi-modal natural language input can be routed for processing at one or more of the input device or the secondary devices to determine an intent thereof based on the intent determination capabilities described in the constellation model. For example, when the constellation model arranges the input device and the secondary devices in the centralized manner, one of the secondary devices may be designated the central device and the natural language input may be processed as described above. However, when the multi-modal natural language cannot be communicated to the central device, the constellation model may be dynamically rearranged in the distributed manner, whereby the input device and the secondary devices share knowledge relating to respective local intent determination capabilities and operate as cooperative nodes to determine the intent of the multi-modal natural language input using the shared knowledge relating to local intent determination capabilities.

Other objects and advantages of the invention will be apparent based on the following drawings and detailed description.

DETAILED DESCRIPTION

Figure 1:
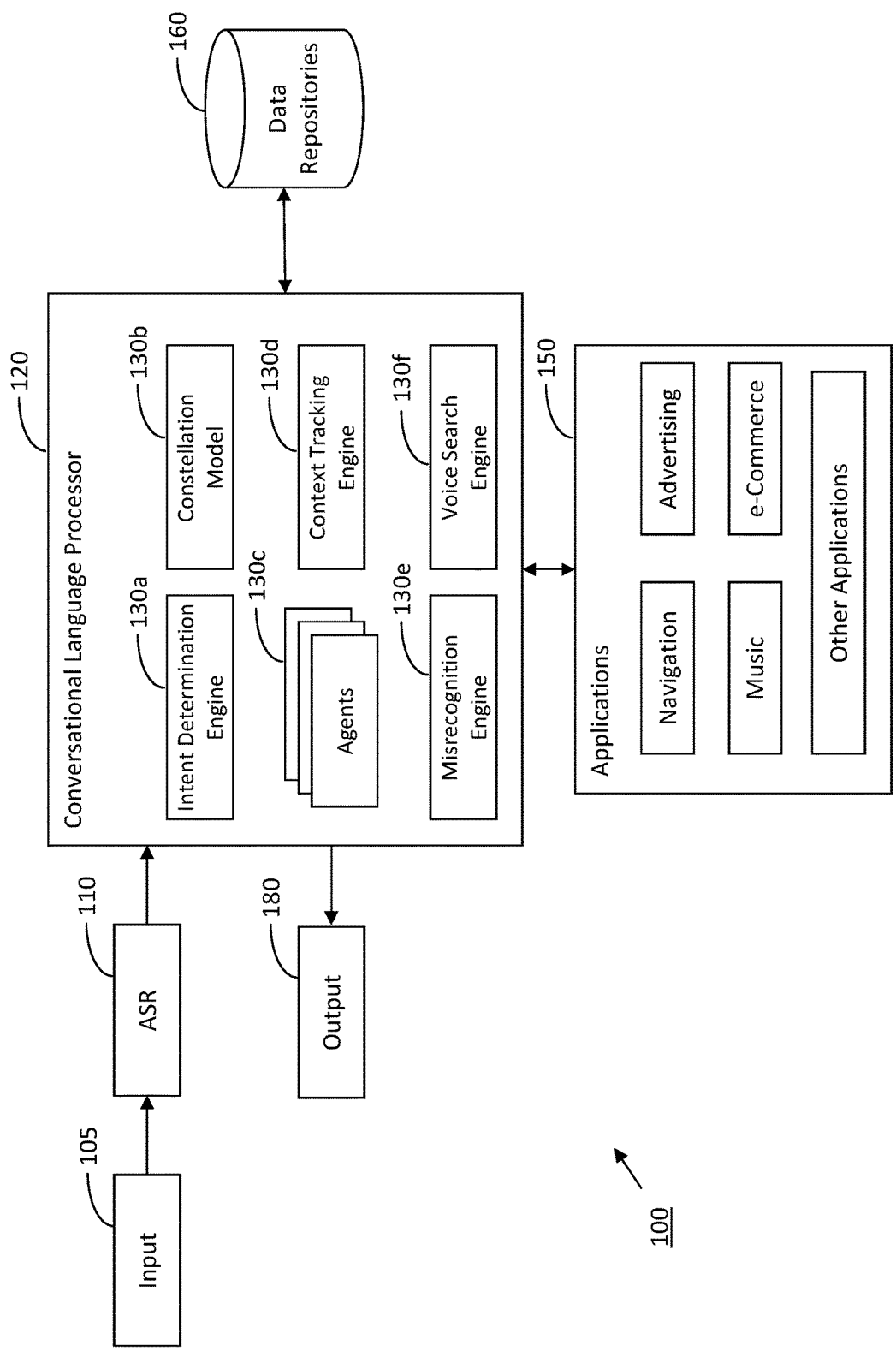
FIG. 1 illustrates a block diagram of an exemplary multi-modal electronic device that may be provided in an integrated, multi-device natural language voice services environment, according to various aspects of the invention.
Figure 2:
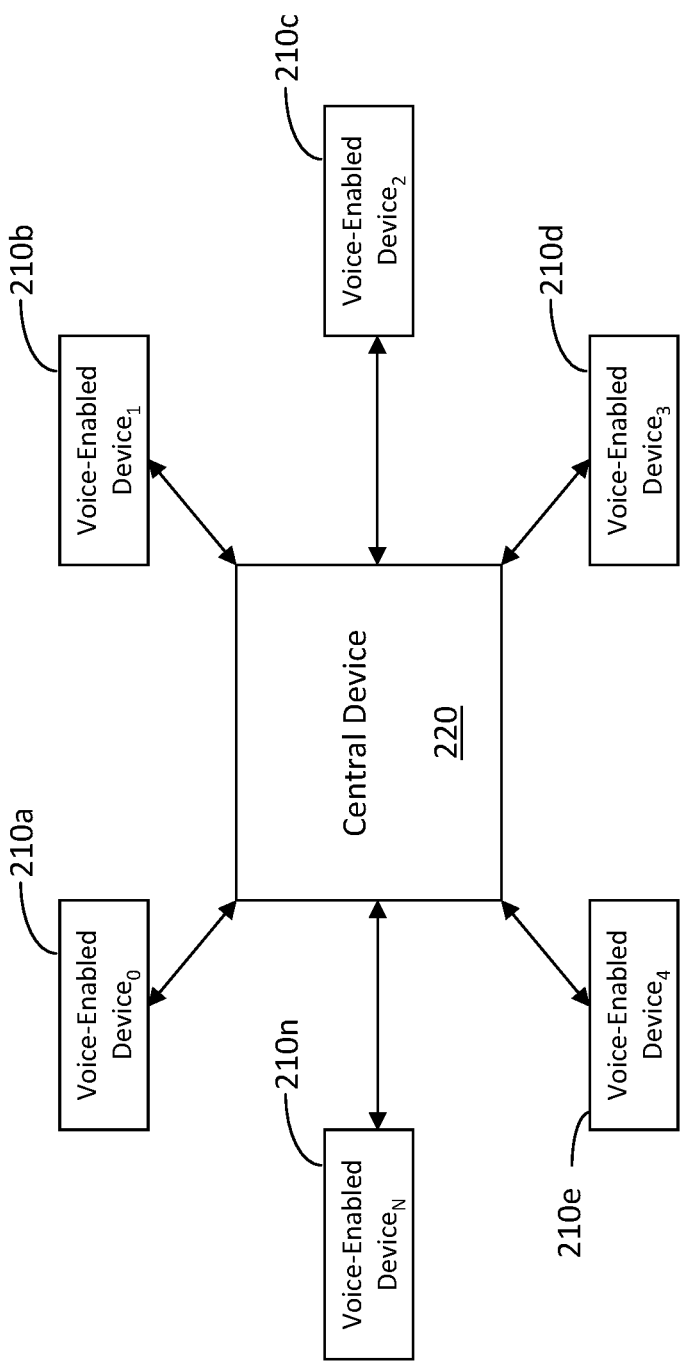
FIG. 2 illustrates a block diagram of an exemplary centralized implementation of the integrated, multi-modal, multi-device natural language voice service environment, according to various aspects of the invention.
Figure 6:
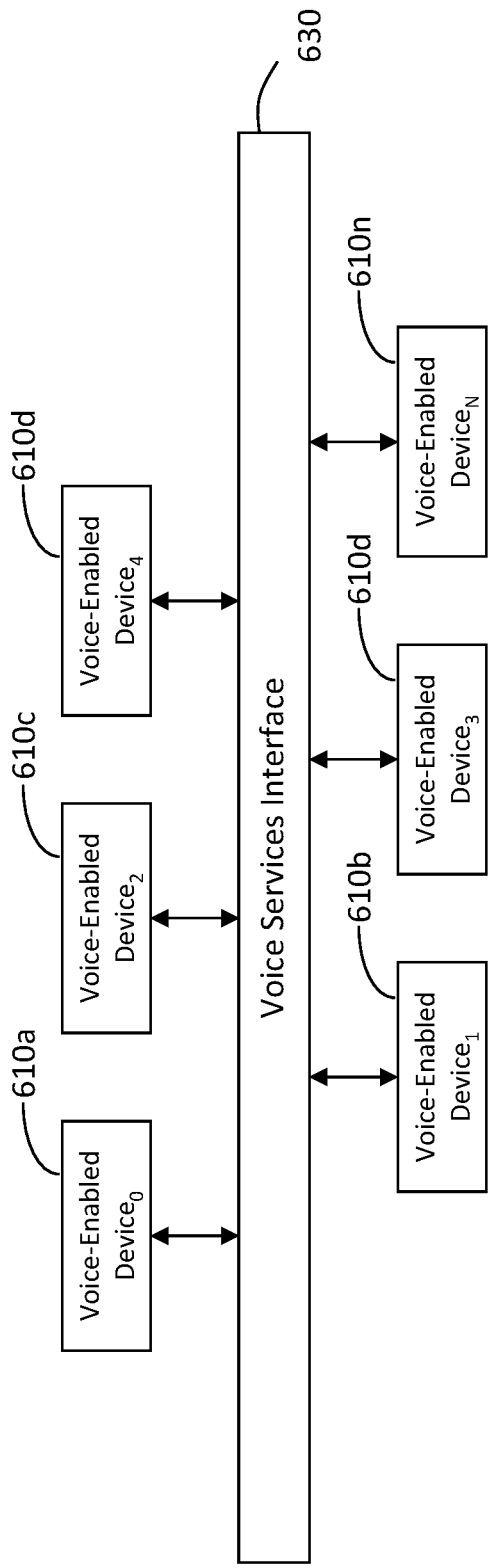
FIG. 6 illustrates a block diagram of an exemplary distributed implementation of the integrated, multi-modal, multi-device natural language voice service environment, according to various aspects of the invention.

According to various aspects of the invention, FIG. 1 illustrates a block diagram of an exemplary multi-modal electronic device 100 that may be provided in a natural language voice services environment that includes one or more additional multi-modal devices (e.g., as illustrated in FIGS. 2 and 6). As will be apparent, the electronic device 100 illustrated in FIG. 1 may be any suitable voice-enabled electronic device (e.g., a telematics device, a personal navigation device, a mobile phone, a VoIP node, a personal computer, a media device, an embedded device, a server, or another electronic device). The device 100 may include various components that collectively provide a capability to process conversational, multi-modal natural language inputs. As such, a user of the device 100 may engage in multi-modal conversational dialogues with the voice-enabled electronic device 100 to resolve requests in a free form, cooperative manner.

For example, the natural language processing components may support free form natural language utterances to liberate the user from restrictions relating to how commands, queries, or other requests should be formulated. Rather, the user may employ any manner of speaking that feels natural in order to request content or services available through the device 100 (e.g., content or services relating to telematics, communications, media, messaging, navigation, marketing, information retrieval, etc.). For instance, in various implementations, the device 100 may process natural language utterances utilizing techniques described in U.S. patent application Ser. No. 10/452,147, entitled "Systems and Methods for Responding to Natural Language Speech Utterance," filed Jun. 3, 2003, and U.S. patent application Ser. No. 10/618,633, entitled "Mobile Systems and Methods for Responding to Natural Language Speech Utterance," filed Jun. 15, 2003, the disclosures of which are hereby incorporated by reference in their entirety.

Moreover, because the device 100 may be deployed in an integrated multi-device environment, the user may further request content or services available through other devices deployed in the environment. In particular, the integrated voice services environment may include a plurality of multi-modal devices, each of which include natural language components generally similar to those illustrated in FIG. 1. The various devices in the environment may serve distinct purposes, however, such that available content, services, applications, or other capabilities may vary among the devices in the environment (e.g., core functions of a media device may vary from those of a personal navigation device). Thus, each device in the environment, including device 100, may have knowledge of content, services, applications, intent determination capabilities, and other features available through the other devices by way of a constellation model 130b. Accordingly, as will be described in greater detail below, the electronic device 100 may cooperate with other devices in the integrated environment to resolve requests by sharing context, prior information, domain knowledge, short-term knowledge, long-term knowledge, and cognitive models, among other things.

According to various aspects of the invention, the electronic device 100 may include an input mechanism 105 that can receive multi-modal natural language inputs, which include at least an utterance spoken by the user. As will be apparent, the input mechanism 105 may include any appropriate device or combination of devices capable of receiving a spoken input (e.g., a directional microphone, an array of microphones, or any other device that can generate encoded speech). Further, in various implementations, the input mechanism 105 can be configured to maximize fidelity of encoded speech, for example, by maximizing gain in a direction of the user, cancelling echoes, nulling point noise sources, performing variable rate sampling, or filtering environmental noise (e.g., background conversations). As such, the input mechanism 105 may generate encoded speech in a manner that can tolerate noise or other factors that could otherwise interfere with accurate interpretation of the utterance.

Furthermore, in various implementations, the input mechanism 105 may include various other input modalities (i.e., the input mechanism 105 may be arranged in a multi-modal environment), in that non-voice inputs can be correlated and/or processed in connection with one or more previous, contemporaneous, or subsequent multi-modal natural language inputs. For example, the input mechanism 105 may be coupled to a touch-screen interface, a stylus and tablet interface, a keypad or keyboard, or any other suitable input mechanism, as will be apparent. As a result, an amount of information potentially available when processing the multi-modal inputs may be maximized, as the user can clarify utterances or otherwise provide additional information in a given multi-modal natural language input using various input modalities. For instance, in an exemplary illustration, the user could touch a stylus or other pointing device to a portion of a touch-screen interface of the device 100, while also providing an utterance relating to the touched portion of the interface (e.g., "Show me restaurants around here"). In this example, the natural language utterance may be correlated with the input received via the touch-screen interface, resulting in "around here" being interpreted in relation to the touched portion of the interface (e.g., as opposed to the user's current location or some other meaning).

According to various aspects of the invention, the device 100 may include an Automatic Speech Recognizer 110 that generates one or more preliminary interpretations of the encoded speech, which may be received from the input mechanism 105. For example, the Automatic Speech Recognizer 110 may recognize syllables, words, or phrases contained in an utterance using one or more dynamically adaptable recognition grammars. The dynamic recognition grammars may be used to recognize a stream of phonemes through phonetic dictation based on one or more acoustic models. Furthermore, as described in U.S. patent application Ser. No. 11/197,504, entitled "Systems and Methods for Responding to Natural Language Speech Utterance," filed Aug. 5, 2005, the disclosure of which is hereby incorporated by reference in its entirety, the Automatic Speech Recognizer 110 may be capable of multi-pass analysis, where a primary speech recognition engine may generate a primary interpretation of an utterance (e.g., using a large list dictation grammar) and request secondary transcription from one or more secondary speech recognition engines (e.g., using a virtual dictation grammar having decoy words for out-of-vocabulary words).

Thus, the Automatic Speech Recognizer 110 may generate preliminary interpretations of an utterance in various ways, including exclusive use of a dictation grammar or virtual dictation grammar, or use of various combinations thereof (e.g., when the device 100 supports multi-pass analysis). In any event, the Automatic Speech Recognizer 110 may provide out-of-vocabulary capabilities and may tolerate portions of a speech signal being dropped, the user misspeaking, or other variables that may occur in natural language speech (e.g., stops and starts, stutters, etc.). Furthermore, the recognition grammars employed by the Automatic Speech Recognizer 110 may include vocabularies, dictionaries, syllables, words, phrases, or other information optimized according to various contextual or application-specific domains (e.g., navigation, music, movies, weather, shopping, news, languages, temporal or geographic proximities, or other suitable domains). Moreover, environmental knowledge (e.g., peer-to-peer affinities, capabilities of devices in the environment, etc.), historical knowledge (e.g., frequent requests, prior context, etc.), or other types of knowledge can be used to continually optimize the information contained in the recognition grammars on a dynamic basis.

For example, information contained in the recognition grammars may be dynamically optimized to improve a likelihood of a given utterance being recognized accurately (e.g., following an incorrect interpretation of a word, the incorrect interpretation may be removed from the grammar to reduce a likelihood of the incorrect interpretation being repeated). Accordingly, the Automatic Speech Recognizer 110 may use a number of techniques to generate preliminary interpretations of natural language utterances, including those described, for example, in U.S. patent application Ser. No. 11/513,269, entitled "Dynamic Speech Sharpening," filed Aug. 31, 2006, the disclosure of which is hereby incorporated by reference in its entirety. Furthermore, the techniques used by the Automatic Speech Recognizer 110 associated with the device 100 may be considered in defining intent determination capabilities of the device 100, and such capabilities may be shared with other devices in the environment to enable convergence of speech recognition throughout the environment (e.g., because various devices may employ distinct speech recognition techniques or have distinct grammars or vocabularies, the devices may share vocabulary translation mechanisms to enhance system-wide recognition).

According to various aspects of the invention, the Automatic Speech Recognizer 110 may provide one or more preliminary interpretations of a multi-modal input, including an utterance contained therein, to a conversational language processor 120. The conversational language processor 120 may include various components that collectively operate to model everyday human-to-human conversations in order to engage in cooperative conversations with the user to resolve requests based on the user's intent. For example, the conversational language processor 120 may include, among other things, an intent determination engine 130a, a constellation model 130b, one or more domain agents 130c, a context tracking engine 130d, a misrecognition engine 130e, and a voice search engine 130f. Furthermore, the conversational language processor 120 may be coupled to one or more data repositories 160 and applications associated with one or more domains. Thus, the intent determination capabilities of the device 100 may be defined based on the data and processing capabilities of the Automatic Speech Recognizer 110 and the conversational language processor 120.

More particularly, the intent determination engine 130a may establish meaning for a given multi-modal natural language input based on a consideration of the intent determination capabilities of the device 100 as well as the intent determination capabilities of other devices in the integrated voice services environment. For example, the intent determination capabilities of the device 100 may be defined as a function of processing resources, storage for grammars, context, agents, or other data, and content or services associated with the device 100 (e.g., a media device with a small amount of memory may have a smaller list of recognizable songs than a device with a large amount of memory). Thus, the intent determination engine 130a may determine whether to process a given input locally (e.g., when the device 100 has intent determination capabilities that suggest favorable conditions for recognition), or whether to route information associated with the input to other devices, which may assist in determining the intent of the input.

As such, to determine which device or combination of devices should process an input, the intent determination engine 130a may evaluate the constellation model 130b, which provides a model of the intent determination capabilities for each of the devices in the integrated voice services environment. For instance, the constellation model 130b may contain, among other things, knowledge of processing and storage resources available to each of the devices in the environment, as well as the nature and scope of domain agents, context, content, services, and other information available to each of the devices in the environment. As such, using the constellation model 130b, the intent determination engine 130a may be able to determine whether any of the other devices have intent determination capabilities that can be invoked to augment or otherwise enhance the intent determination capabilities of the device 100 (e.g., by routing information associated with a multi-modal natural language input to the device or devices that appear best suited to analyze the information and therefore determine an intent of the input). Accordingly, the intent determination engine 130a may establish the meaning of a given utterance by utilizing the comprehensive constellation model 130b that describes capabilities within the device 100 and across the integrated environment. The intent determination engine 130a may therefore optimize processing of a given natural language input based on capabilities throughout the environment (e.g., utterances may be processed locally to the device 100, routed to a specific device based on information in the constellation model 130b, or flooded to all of the devices in the environment in which case an arbitration may occur to select a best guess at an intent determination).

Although the following discussion will generally focus on various techniques that can be used to determine the intent of multi-modal natural language inputs in the integrated multi-device environment, it will be apparent that the natural language processing capabilities of any one of the devices may extend beyond the specific discussion that has been provided herein. As such, in addition to the co-pending U.S. patent applications referenced above, further natural language processing capabilities that may be employed include those described in U.S. patent application Ser. No. 11/197, 504, entitled "Systems and Methods for Responding to Natural Language Speech Utterance," filed Aug. 5, 2005, U.S. patent application Ser. No. 11/200,164, entitled "System and Method of Supporting Adaptive Misrecognition in Conversational Speech," filed Aug. 10, 2005, U.S. patent application Ser. No. 11/212,693, entitled "Mobile Systems and Methods of Supporting Natural Language Human-Machine Interactions," filed Aug. 29, 2005, U.S. patent application Ser. No. 11/580,926, entitled "System and Method for a Cooperative Conversational Voice User Interface," filed Oct. 16, 2006, U.S. patent application Ser. No. 11/671,526, entitled "System and Method for Selecting and Presenting Advertisements Based on Natural Language Processing of Voice-Based Input," filed Feb. 6, 2007, and U.S.

patent application Ser. No. 11/954,064, entitled "System and Method for Providing a Natural Language Voice User Interface in an Integrated Voice Navigation Services Environment," filed Dec. 11, 2007, the disclosures of which are hereby incorporated by reference in their entirety.

According to various aspects of the invention, FIG. 2 illustrates a block diagram of an exemplary centralized implementation of the integrated, multi-modal, multi-device natural language voice service environment. As will be apparent from the further description to be provided herein, the centralized implementation of the integrated, multi-device voice services environment may enable a user to engage in conversational, multi-modal natural language interactions with any one of voice-enabled devices 210a-n or central voice-enabled device 220. As such, the multi-device voice services environment may collectively determine intent for any given multi-modal natural language input, whereby the user may request content or voice services relating to any device or application in the environment, without restraint.

As illustrated in FIG. 2, the centralized implementation of the multi-device voice service environment may include a plurality of voice-enabled devices 210a-n, each of which include various components capable of determining intent of natural language utterances, as described above in reference to FIG. 1. Furthermore, as will be apparent, the centralized implementation includes a central device 220, which contains information relating to intent determination capabilities for each of the other voice-enabled devices 210a-n. For example, in various exemplary implementations, the central device 220 may be designated as such by virtue of being a device most capable of determining the intent of an utterance (e.g., a server, home data center, or other device having significant processing power, memory resources, and communication capabilities making the device suitable to manage intent determination across the environment). In another exemplary implementation, the central device 220 may be dynamically selected based on one or more characteristics of a given multi-modal natural language input, dialogue, or interaction (e.g., a device may be designated as the central device 220 when a current utterance relates to a specific domain).

In the centralized implementation illustrated in FIG. 2, a multi-modal natural language input may be received at one of the voice-enabled devices 210a-n. Therefore, the receiving one of the devices 210a-n may be designated as an input device for that input, while the remaining devices 210a-n may be designated as secondary devices for that input. In other words, for any given multi-modal natural language input, the multi-device environment may include an input device that collects the input, a central device 220 that aggregates intent determination, inferencing, and processing capabilities for all of the devices 210a-n in the environment, and one or more secondary devices that may also be used in the intent determination process. As such, each device 210 in the environment may be provided with a constellation model that identifies all of the devices 210 having incoming and outgoing communication capabilities, thus indicating an extent to which other devices may be capable of determining intent for a given multi-modal natural language input. The constellation model may further define a location of the central device 220, which aggregates context, vocabularies, content, recognition grammars, misrecognitions, shared knowledge, intent determination capabilities, inferencing capabilities, and other information from the various devices 210a-n in the environment.

Accordingly, as communication and processing capabilities permit, the central device 220 may be used as a recognizer of first or last resort. For example, because the central device 220 converges intent determination capabilities across the environment (e.g., by aggregating context, vocabularies, device capabilities, and other information from the devices 210a-n in the environment), inputs may be automatically routed to the central device 220 when used as a recognizer of first resort, or as a recognizer of last resort when local processing at the input device 210 cannot determine the intent of the input with a satisfactory level of confidence. However, it will also be apparent that in certain instances the input device 210 may be unable to make contact with the central device 220 for various reasons (e.g., a network connection may be unavailable, or a processing bottleneck at the central device 220 may cause communication delays). In such cases, the input device 210 that has initiated contact with the central device 220 may shift into decentralized processing (e.g., as described in reference to FIG. 6) and communicate capabilities with one or more of the other devices 210a-n in the constellation model. Thus, when the central device 220 cannot be invoked for various reasons, the remaining devices 210a-n may operate as cooperative nodes to determine intent in a decentralized manner.

Additionally, in the multi-device voice services environment, the central device 220 and the various other devices 210a-n may cooperate to create a converged model of capabilities throughout the environment. For example, as indicated above, in addition to having intent determination capabilities based on processing resources, memory resources, and device capabilities, each of the devices 210a-n and the central device 220 may include various other natural language processing components. The voice services environment may therefore operate in an integrated manner by maintaining not only a complete model of data, content, and services associated with the various devices 210a-n, but also of other natural language processing capabilities and dynamic states associated with the various devices 210a-n. As such, the various devices 210a-n may operate with a goal of converging capabilities, data, states, and other information across the device, either on one device (e.g., the central device 220) or distributed among the various devices 210a-n (e.g., as in the decentralized implementation to be described in FIG. 6).

For example, as discussed above, each device 210 includes an Automatic Speech Recognizer, one or more dynamically adaptable recognition grammars, and vocabulary lists used to generate phonemic interpretations of natural language utterances. Moreover, each device 210 includes locally established context, which can range from information contained in a context stack, context and namespace variables, vocabulary translation mechanisms, short-term shared knowledge relating to a current dialogue or conversational interaction, long-term shared knowledge relating to a user's learned preferences over time, or other contextual information. Furthermore, each device 210 may have various services or applications associated therewith, and may perform various aspects of natural language processing locally. Thus, additional information to be converged throughout the environment may include partial or preliminary utterance recognitions, misrecognitions or ambiguous recognitions, inferencing capabilities, and overall device state information (e.g., songs playing in the environment, alarms set in the environment, etc.).

Thus, various data synchronization and referential integrity algorithms may be employed in concert by the various devices 210a-n and the central device 220 to provide a consistent worldview of the environment. For example, information may be described and transmitted throughout the environment for synchronization and convergence purposes using the Universal Plug and Play protocol designed for computer ancillary devices, although the environment can also operate in a peer-to-peer disconnected mode (e.g., when the central device 220 cannot be reached). However, in various implementations, the environment may also operate in a peer-to-peer mode regardless of the disconnected status, as illustrated in FIG. 6, for example, when the devices 210a-n have sufficient commensurate resources and capabilities for natural language processing.

In general, the algorithms for convergence in the environment can be executed at various intervals, although it may be desirable to limit data transmission so as to avoid processing bottlenecks. For example, because the convergence and synchronization techniques relate to natural language processing, in which any given utterance will typically be expressed over a course of several seconds, information relating to context and vocabulary need not be updated on a time frame of less than a few seconds. However, as communication capabilities permit, context and vocabulary could be updated more frequently to provide real-time recognition or the appearance of real-time recognition. In another implementation, the convergence and synchronization may be permitted to run until completion (e.g., when no requests are currently pending), or the convergence and synchronization may be suspended or terminated when a predetermined time or resource consumption limit has been reached (e.g., when the convergence relates to a pending request, an intent determination having a highest confidence level at the time of cut-off may be used).

By establishing a consistent view of capabilities, data, states, and other information throughout the environment, an input device 210 may cooperate with the central device 220 and one or more secondary devices (i.e., one or more of devices 210a-n, other than the input device) in processing any given multi-modal natural language input. Furthermore, by providing each device 210 and the central device 220 with a constellation model that describes a synchronized state of the environment, the environment may be tolerant of failure by one or more of the devices 210a-n, or of the central device 220. For example, if the input device 210 cannot communicate with the central device 220 (e.g., because of a server crash), the input device 210 may enter a disconnected peer-to-peer mode, whereby capabilities can be exchanged with one or more devices 210a-n with which communications remain available. To that end, when a device 210 establishes new information relating to vocabulary, context, misrecognitions, agent adaptation, intent determination capabilities, inferencing capabilities, or otherwise, the device 210 may transmit the information to the central device 220 for convergence purposes, as discussed above, in addition to consulting the constellation model to determine whether the information should be transmitted to one or more of the other devices 210a-n.

For example, suppose the environment includes a voice-enabled mobile phone that has nominal functionality relating to playing music or other media, and which further has a limited amount of local storage space, while the environment further includes a voice-enabled home media system that includes a mass storage medium that provides dedicated media functionality. If the mobile phone were to establish new vocabulary, context, or other information relating to a song (e.g., a user downloads the song or a ringtone to the mobile phone while on the road), the mobile phone may transmit the newly established information to the home media system in addition to the central device 220. As such, by having a model of all of the devices 210a-n in the environment and transmitting new information to the devices where it will most likely be useful, the various devices may handle disconnected modes of operation when the central device 220 may be unavailable for any reason, while resources may be allocated efficiently throughout the environment.

Thus, based on the foregoing discussion, it will be apparent that a centralized implementation of an integrated multi-device voice services environment may generally include a central device 220 operable to aggregate or converge knowledge relating to content, services, capabilities, and other information associated with various voice-enabled devices 210a-n deployed within the environment. In such centralized implementations, the central device 220 may be invoked as a recognizer of first or last resort, as will be described in greater detail with reference to FIGS. 3-5, and furthermore, the other devices 210a-n in the environment may be configured to automatically enter a disconnected or peer-to-peer mode of operation when the central device 220 cannot be invoked for any reason (i.e., devices may enter a decentralized or distributed mode, as will be described in greater detail with reference to FIGS. 6-7). Knowledge and capabilities of each of the devices 210a-n may therefore be made available throughout the voice services environment in a centralized manner, a distributed manner, or various combinations thereof, thus optimizing an amount of natural language processing resources used to determine an intent of any given multi-modal natural language input.

Figure 3:
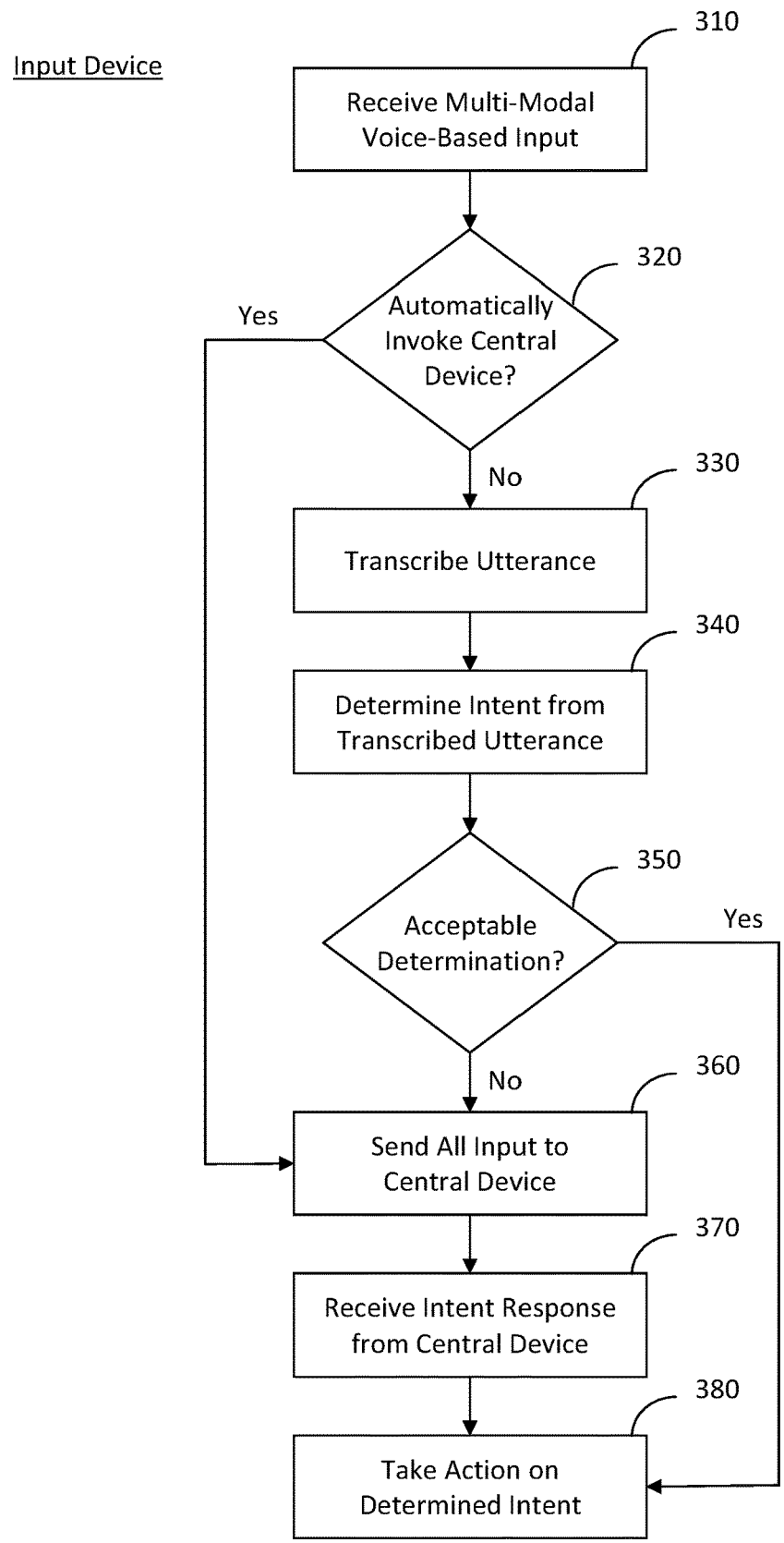
FIG. 3 illustrates a flow diagram of an exemplary method for processing multi-modal, natural language inputs at an input device in the centralized implementation of the integrated, multi-modal, multi-device natural language voice service environment, according to various aspects of the invention.
Figure 4:
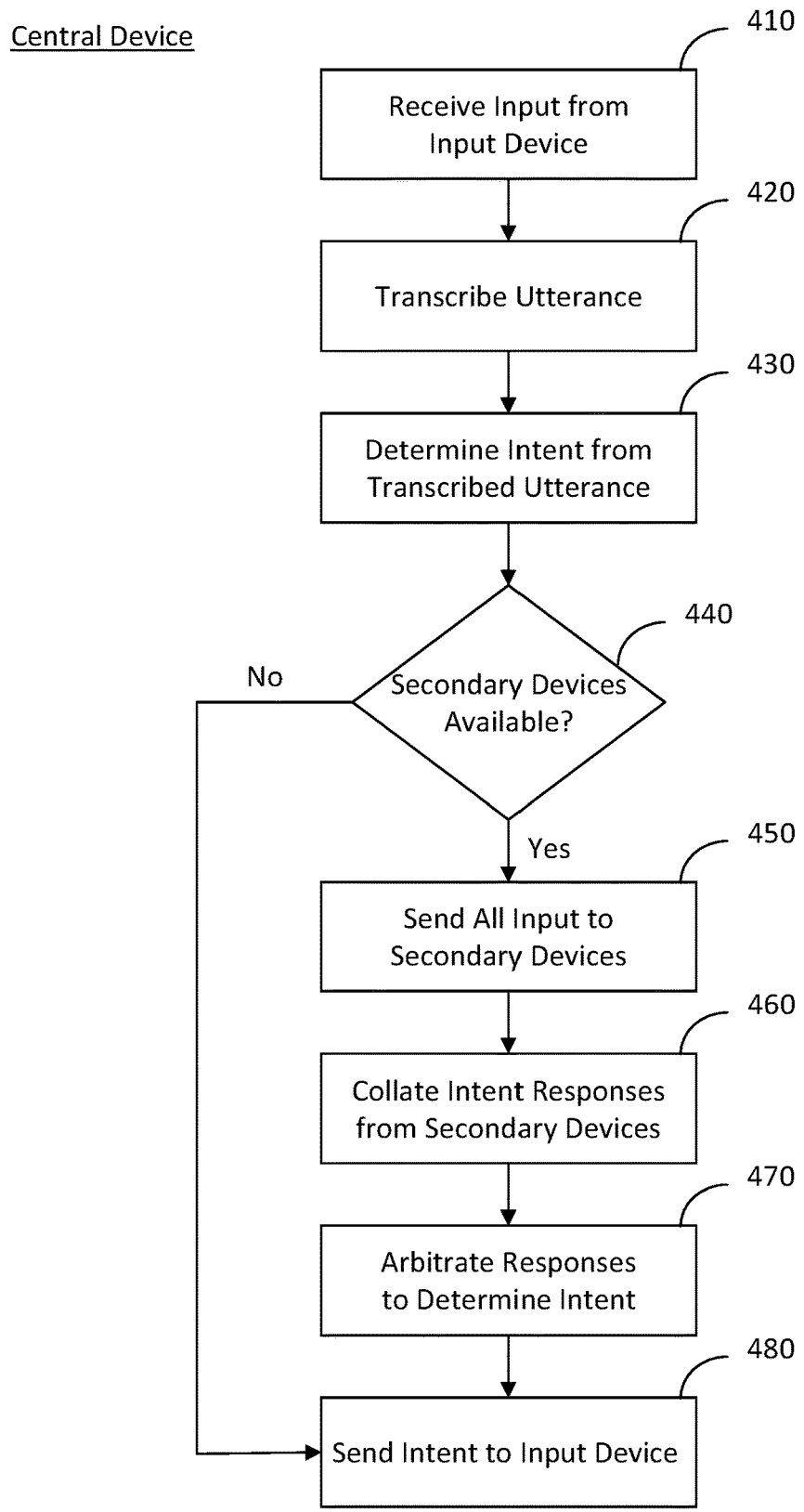
FIG. 4 illustrates a flow diagram of an exemplary method for processing multi-modal, natural language inputs at a central device in the centralized implementation of the integrated, multi-modal, multi-device natural language voice service environment, according to various aspects of the invention.
Figure 5:
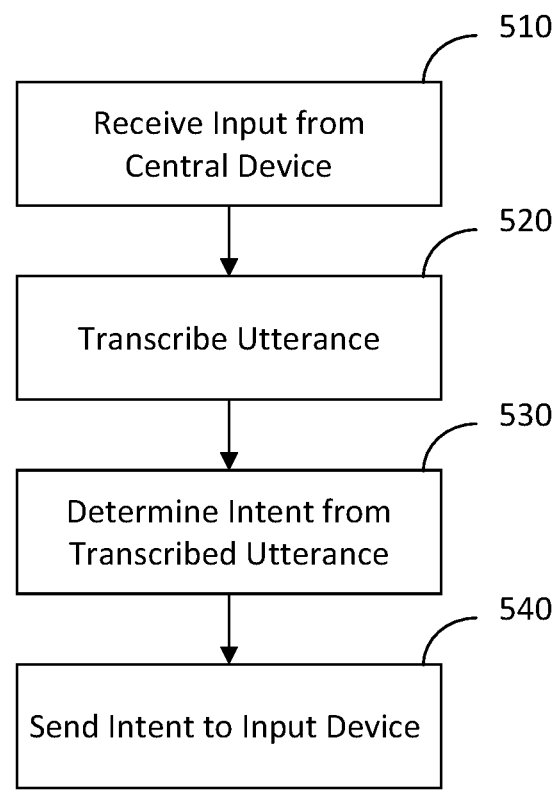
FIG. 5 illustrates a flow diagram of an exemplary method for processing multi-modal, natural language inputs at a secondary device in the centralized implementation of the integrated, multi-modal, multi-device natural language voice service environment, according to various aspects of the invention.

According to various aspects of the invention, FIG. 3 illustrates a flow diagram of an exemplary method for processing multi-modal, natural language inputs at an input device in the centralized implementation of the integrated, multi-modal, multi-device natural language voice service environment. Similarly, FIGS. 4 and 5 illustrate corresponding methods associated with a central device and one or more secondary devices, respectively, in the centralized voice service environment. Furthermore, it will be apparent that the processing techniques described in relation to FIGS. 3-5 may generally be based on the centralized implementation illustrated in FIG. 2 and described above, whereby the input device may be assumed to be distinct from the central device, and the one or more secondary devices may be assumed to be distinct from the central device and the input device. However, it will be apparent that various instances may involve a natural language input being received at the central device or at another device, in which case the techniques described in FIGS. 3-5 may be vary depending on circumstances of the environment (e.g., decisions relating to routing utterances to a specific device or devices may be made locally, collaboratively, or in other ways depending on various factors, such as overall system state, communication capabilities, intent determination capabilities, or otherwise).

As illustrated in FIG. 3, a multi-modal natural language input may be received at an input device in an operation 310. The multi-modal input may include at least a natural language utterance provided by a user, and may further include other input modalities such as audio, text, button presses, gestures, or other non-voice inputs. It will also be apparent that prior to receiving the natural language input in operation 310, the input device may be configured to establish natural language processing capabilities. For example, establishing natural language processing capabilities may include, among other things, loading an Automatic Speech Recognizer and any associated recognition grammars, launching a conversational language processor to handle dialogues with the user, and installing one or more domain agents that provide functionality for respective application domains or contextual domains (e.g., navigation, music, movies, weather, information retrieval, device control, etc.).

The input device may also be configured to coordinate synchronization of intent determination capabilities, shared knowledge, and other information with the central device and the secondary devices in the environment prior to receiving the input at operation 310. For example, when the input device installs a domain agent, the installed domain agent may bootstrap context variables, semantics, namespace variables, criteria values, and other context related to that agent from other devices in the system. Similarly, misrecognitions may be received from the central device and the secondary devices in order to enable correction of agents that use information relevant to the received misrecognitions, and vocabularies and associated translation mechanisms may be synchronized among the devices to account for potential variations between the Automatic Speech Recognizers used by the various devices (e.g., each device in the environment cannot be guaranteed to use the same Automatic Speech Recognizer or recognition grammars, necessitating vocabulary and translation mechanisms to be shared among the devices that share intent determination capabilities).

Upon establishing and synchronizing natural language processing capabilities and subsequently receiving a multi-modal natural language input in operation 310, the input device may determine whether the environment has been set up to automatically transmit the input to the central device in a decisional operation 320. In such a case, processing proceeds to an operation 360 for transmitting the input to the central device, which may then process the input according to techniques to be described in relation to FIG. 4. If the environment has not been set up to automatically communicate the input to the central device, however, processing proceeds to an operation 330, where the input device performs transcription of the natural language utterance contained in the multi-modal input. For example, the input device may transcribe the utterance using the Automatic Speech Recognizer and recognition grammars associated therewith according to techniques described above and in the above-referenced U.S. patent applications.

Subsequently, in an operation 340, an intent of the multi-modal natural language input may be determined at the input device using local natural language processing capabilities and resources. For example, any non-voice input modalities included in the input may be merged with the utterance transcription and a conversational language processor associated with the input device may utilize local information relating to context, domain knowledge, shared knowledge, context variables, criteria values, or other information useful in natural language processing. As such, the input device may attempt to determine a best guess as to an intent of the user that provided the input, such as identifying a conversation type (e.g., query, didactic, or exploratory) or request that may be contained in the input (e.g., a command or query relating to one or more domain agents or application domains).

The intent determination of the input device may be assigned a confidence level (e.g., a device having an Automatic Speech Recognizer that implements multi-pass analysis may assign comparatively higher confidence levels to utterance transcriptions created thereby, which may result in a higher confidence level for the intent determination). The confidence level may be assigned based on various factors, as described in the above-referenced U.S. patent applications. As such, a decisional operation 350 may include determining whether the intent determination of the input device meets an acceptable level of confidence. When the intent determination meets the acceptable level confidence, processing may proceed directly to an operation 380 where action may be taken in response thereto. For example, when the intent determination indicates that the user has requested certain information, one or more queries may be formulated to retrieve the information from appropriate information sources, which may include one or more of the other devices. In another example, when the intent determination indicates that the user has requested a given command (e.g., to control a specific device), the command may be routed to the appropriate device for execution.

Thus, in cases where the input device can determine the intent of a natural language input without assistance from the central device or the secondary devices, communications and processing resources may be conserved by taking immediate action as may be appropriate. On the other hand, when the intent determination of the input device does not meet the acceptable level of confidence, decisional operation 350 may result in the input device requesting assistance from the central device in operation 360. In such a case, the multi-modal natural language input may be communicated to the central device in its entirety, whereby the central device processes the input according to techniques described in FIG. 4. However, should transmission to the central device fail for some reason, the input device may shift into a disconnected peer-to-peer mode where one or more secondary devices may be utilized, as will be described below in relation to FIG. 7. When transmission to the central device occurs without incident, however, the input device may receive an intent determination from the central device in an operation 370, and may further receive results of one or more requests that the central device was able to resolve, or requests that the central device has formulated for further processing on the input device. As such, the input device may take action in operation 380 based on the information received from the central device in operation 370. For example, the input device may route queries or commands to local or remote information sources or devices based on the intent determination, or may present results of the requests processed by the central device to the user.

Referring to FIG. 4, the central device may receive the multi-modal natural language input from the input device in an operation 410. The central device, having aggregated context and other knowledge from throughout the environment, may thus transcribe the utterance in an operation 420 and determine an intent of the input from the transcribed utterance in an operation 430. As such, the central device may consider information relating to context, domain agents, applications, and device capabilities throughout the environment in determining the intent of the utterance, including identification of one or more domains relevant to the input. However, it will be apparent that utilizing information aggregated from throughout the environment may cause ambiguity or uncertainty in various instances (e.g., an utterance containing the word "traffic" may have a different intent in domains relating to movies, music, and navigation).

As such, once the central device has attempted to determine the intent of the natural language input, a determination may be made in an operation 440 as to whether one or more secondary devices (i.e., other devices in the constellation besides the input device) may also be capable of intent determination in the identified domain or domains. When no such secondary devices can be identified, decisional operation 440 may branch directly to an operation 480 to send to the input device the determined intent and any commands, queries, or other requests identified from the determined intent.

On the other hand, when one or more secondary devices in the environment have intent determination capabilities in the identified domain or domains, the natural language input may be sent to such secondary devices in an operation 450. The secondary devices may then determine an intent as illustrated in FIG. 5, which may include techniques generally similar to those described above in relation to the input device and central device (i.e., the natural language input may be received in an operation 510, an utterance contained therein may be transcribed in an operation 520, and an intent determination made in an operation 530 may be returned to the central device in an operation 540).

Returning to FIG. 4, the central device may collate intent determination responses received from the secondary devices in an operation 460. For example, as indicated above, the central device may identify one or more secondary devices capable of determining intent in a domain that the central device has identified as being relevant to the natural language utterance. As will be apparent, the secondary devices invoked in operation 450 may often include a plurality of devices, and intent determination responses may be received from the secondary devices in an interleaved manner, depending on processing resources, communications throughput, or other factors (e.g., the secondary devices may include a telematics device having a large amount of processing power and a broadband network connection and an embedded mobile phone having less processing power and only a cellular connection, in which case the telematics device may be highly likely to provide results to the central device before the embedded mobile phone). Thus, based on potential variations in response time of secondary devices, the central device may be configured to place constraints on collating operation 460. For example, the collating operation 460 may be terminated as soon as an intent determination has been received from one of the secondary devices that meets an acceptable level of confidence, or the operation 460 may be cut off when a predetermined amount of time has lapsed or a predetermined amount of resources have been consumed. In other implementations, however, it will be apparent that collating operation 460 may be configured to run to completion, regardless of whether delays have occurred or suitable intent determinations have been received. Further, it will be apparent that various criteria may be used to determine whether or when to end the collating operation 460, including the nature of a given natural language input, dialogue, or other interaction, or system or user preferences, among other criteria, as will be apparent.

In any event, when the collating operation 460 has completed, a subsequent operation 470 may include the central device arbitrating among the intent determination responses received from one or more of the secondary devices previously invoked in operation 450. For example, each of the invoked secondary devices that generate an intent determination may also assign a confidence level to that intent determination, and the central device may consider the confidence levels in arbitrating among the responses. Moreover, the central device may associate other criteria with the secondary devices or the intent determinations received from the secondary devices to further enhance a likelihood that the best intent determination will be used. For example, various ones of the secondary devices may only be invoked for partial recognition in distinct domains, and the central device may aggregate and arbitrate the partial recognitions to create a complete transcription. In another example, a plurality of secondary devices may be invoked to perform overlapping intent determination, and the central device may consider capabilities of the secondary devices to weigh the respective confidence levels (e.g., when one of two otherwise identical secondary devices employs multi-pass speech recognition analysis, the secondary device employing the multi-pass speech recognition analysis may be weighed as having a higher likelihood of success). It will be apparent that the central device may be configured to arbitrate and select one intent determination from among all of the intent hypotheses, which may include the intent determination hypothesis generated by the central device in operation 430. Upon selecting the best intent determination hypothesis, the central device may then provide that intent determination to the input device in operation 480, as well as any commands, queries, or other requests that may be relevant thereto. The input device may then take appropriate action as described above in relation to FIG. 3.

According to various aspects of the invention, FIG. 6 illustrates a block diagram of an exemplary distributed implementation of the integrated, multi-modal, multi-device natural language voice service environment. As described above, the distributed implementation may also be categorized as a disconnected or peer-to-peer mode that may be employed when a central device in a centralized implementation cannot be reached or otherwise does not meet the needs of the environment. The distributed implementation illustrated in FIG. 6 may be generally operate with similar purposes as described above in relation to the centralized implementation (i.e., to ensure that the environment includes a comprehensive model of aggregate knowledge and capabilities of a plurality of devices 610a-n in the environment). Nonetheless, the distributed implementation may operate in a somewhat different manner, in that one or more of the devices 610a-n may be provided with the entire constellation model, or various aspects of the model may be distributed among the plurality of devices 610a-n, or various combinations thereof.

Generally speaking, the plurality of voice-enabled devices 610a—may be coupled to one another by a voice services interface 630, which may include any suitable real or virtual interface (e.g., a common message bus or network interface, a service-oriented abstraction layer, etc.). The various devices 610a-n may therefore operate as cooperative nodes in determining intent for multi-modal natural language utterances received by any one of the devices 610. Furthermore, the devices 610a-n may share knowledge of vocabularies, context, capabilities, and other information, while certain forms of data may be synchronized to ensure consistent processing among the devices 610a-n. For example, because natural language processing components used in the devices 610a-n may vary (e.g., different recognition grammars or speech recognition techniques may exist), vocabulary translation mechanisms, misrecognitions, context variables, criteria values, criteria handlers, and other such information used in the intent determination process should be synchronized to the extent that communication capabilities permit.

By sharing intent determination capabilities, device capabilities, inferencing capabilities, domain knowledge, and other information, decisions as to routing an utterance to a specific one of the devices 610a-n may be made locally (e.g., at an input device), collaboratively (e.g., a device having particular capabilities relevant to the utterance may communicate a request to process the utterance), or various combinations thereof (e.g., the input device may consider routing to secondary devices only when an intent of the utterance cannot be determined). Similarly, partial recognition performed at one or more of the devices 610a-n may be used to determine routing strategies for further intent determination of the utterance. For example, an utterance that contains a plurality of requests relating to a plurality of different domains may be received at an input device that can only determine intent in one of the domains. In this example, the input device may perform partial recognition for the domain associated with the input device, and the partial recognition may also identify the other domains relevant to the utterance for which the input device does not have sufficient recognition information. Thus, the partial recognition performed by the input device may result in identification of other potentially relevant domains and a strategy may be formulated to route the utterance to other devices in the environment that include recognition information for those domains.

As a result, multi-modal natural language inputs, including natural language utterances, may be routed among the various devices 610a-n in order to perform intent determination in a distributed manner. However, as the capabilities and knowledge held by any one of the devices 610a-n may vary, each of the devices 610a-n may be associated with a reliability factor for intent determinations generated by the respective devices 610a-n. As such, to ensure that final intent determinations can be relied upon with a sufficient level of confidence, knowledge may be distributed among the devices 610a-n to ensure that reliability metrics for intent determinations provided by each of the devices 610a-n are commensurable throughout the environment. For example, additional knowledge may be provided to a device having a low intent determination reliability, even when such knowledge results in redundancy in the environment, to ensure commensurate reliability of intent determination environment-wide.

Therefore, in distributed implementations of the integrated voice services environment, utterances may be processed in various ways, which may depend on circumstances at a given time (e.g., system states, system or user preferences, etc.). For example, an utterance may be processed locally at an input device and only routed to secondary devices when an intent determination confidence level falls below a given threshold. In another example, utterances may be routed to a specific device based on the modeling of knowledge and capabilities discussed above. In yet another example, utterances may be flooded among all of the devices in the environment, and arbitration may occur whereby intent determinations may be collated and arbitrated to determine a best guess at intent determination.

Figure 7:
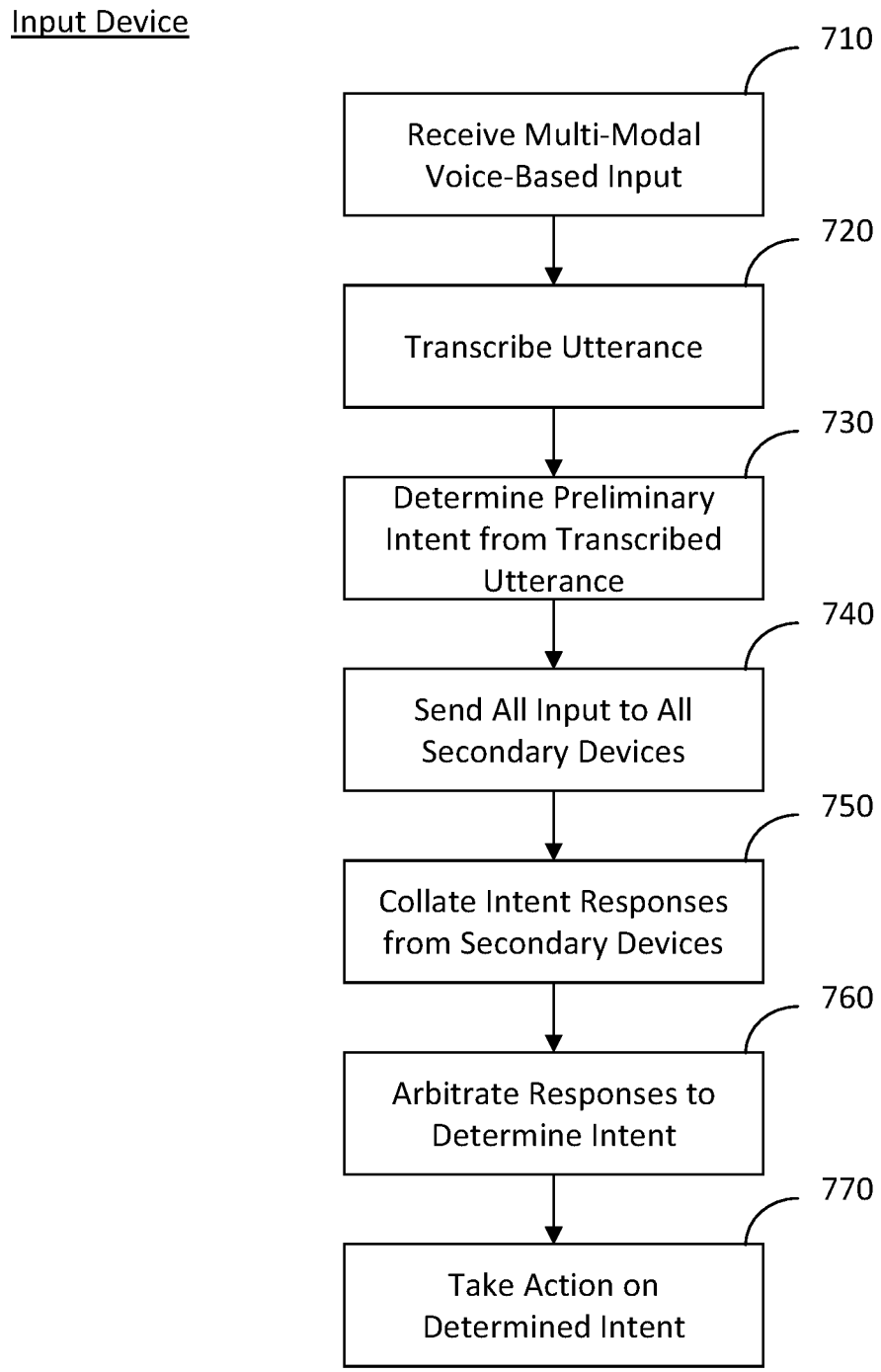
FIG. 7 illustrates a flow diagram of an exemplary method for processing multi-modal, natural language inputs at an input device in the distributed implementation of the integrated, multi-modal, multi-device natural language voice service environment, according to various aspects of the invention.

Thus, utterances may be processed in various ways, including through local techniques, centralized techniques, distributed techniques, and various combinations thereof. Although many variations will be apparent, FIG. 7 illustrates an exemplary method for combined local and distributed processing of multi-modal, natural language inputs in a distributed implementation of the voice service environment, according to various aspects of the invention. In particular, the distributed processing may begin in an operation 710, where a multi-modal natural language input may be received at an input device. The input device may then utilize various natural language processing capabilities associated therewith in an operation 720 to transcribe an utterance contained in the multi-modal input (e.g., using an Automatic Speech Recognizer and associated recognition grammars), and may subsequently determine a preliminary intent of the multi-modal natural language input in an operation 730. It will be apparent that operations 710 through 730 may generally be performed using local intent determination capabilities associated with the input device.

Thereafter, the input device may invoke intent determination capabilities of one or more secondary devices in an operation 740. More particularly, the input device may provide information associated with the multi-modal natural language input to one or more of the secondary devices, which may utilize local intent determination capabilities to attempt to determine intent of the input using techniques as described in relation to FIG. 5. It will also be apparent that, in various implementations, the secondary devices invoked in operation 740 may include only devices having intent determination capabilities associated with a specific domain identified as being associated with the input. In any event, the input device may receive intent determinations from the invoked secondary devices in an operation 750, and the input device may then collate the intent determinations received from the secondary devices. The input device may then arbitrate among the various intent determinations, or may combine various ones of the intent determinations (e.g., when distinct secondary devices determine intent in distinct domains), or otherwise arbitrate among the intent determinations to determine a best guess at the intent of the multi-modal natural language input (e.g., based on confidence levels associated with the various intent determinations). Based on the determined intent, the input device may then take appropriate action in an operation 770, such as issuing one or more commands, queries, or other requests to be executed at one or more of the input device or the secondary devices.

Furthermore, in addition to the exemplary implementations described above, various implementations may include a continuous listening mode of operation where a plurality of devices may continuously listen for multi-modal voice-based inputs. In the continuous listening mode, each of the devices in the environment may be triggered to accept a multi-modal input when one or more predetermined events occur. For example, the devices may each be associated with one or more attention words, such as "Phone, <multi-modal request>" for a mobile phone, or "Computer, <multi-modal request>" for a personal computer. When one or more of the devices in the environment recognize the associated attention word, keyword activation may result, where the associated devices trigger to accept the subsequent multi-modal request. Further, where a plurality of devices in a constellation may be listening, the constellation may use all available inputs to increase recognition rates.

Moreover, it will be apparent that the continuous listening mode may be applied in centralized voice service environments, distributed centralized voice service environments, or various combinations thereof. For example, when each device in the constellation has a different attention word, any given device that recognizes an attention word may consult a constellation model to determine a target device or functionality associated with the attention word. In another example, when a plurality of devices in the constellation share one or more attention words, the plurality of devices may coordinate with one another to synchronize information for processing the multi-modal input, such as a start time for an utterance contained therein.

Implementations of the invention may be made in hardware, firmware, software, or various combinations thereof. The invention may also be implemented as instructions stored on a machine-readable medium, which may be read and executed by one or more processors. A machine-readable medium may include various mechanisms for storing or transmitting information in a form readable by a machine (e.g., a computing device). For example, a machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described in the above disclosure in terms of specific exemplary aspects and implementations of the invention, and performing certain actions. However, it will be apparent that such descriptions are merely for convenience and that such actions in fact result from computing devices, processors, controllers, or other devices executing the firmware, software, routines, or instructions.

Aspects and implementations may be described as including a particular feature, structure, or characteristic, but every aspect or implementation may not necessarily include the particular feature, structure, or characteristic. Further, when a particular feature, structure, or characteristic has been described in connection with an aspect or implementation, it will be understood that such feature, structure, or characteristic may be included in connection with other aspects or implementations, whether or not explicitly described. Thus, various changes and modifications may be made to the preceding description without departing from the scope or spirit of the invention, and the specification and drawings should therefore be regarded as exemplary only, and the scope of the invention determined solely by the appended claims.

What is claimed is:

1. A method of providing an integrated natural language voice services environment comprising one or more of an input device that receives a natural language utterance, a first device, or one or more secondary devices, the method being implemented in the first device having one or more physical processors programmed with computer program instructions that, when executed by the one or more physical processors, program the first device to perform the method, the method comprising:
    obtaining, by the first device from the input device, the natural language utterance;
    transcribing, by the first device, the natural language utterance;
    determining, by the first device, a preliminary intent prediction of the natural language utterance based on the transcribing; and
    invoking, by the first device, at least one action at one or more of the input device, the first device, or the one or more secondary devices based on the preliminary intent prediction.

2. The method of claim 1, wherein invoking the at least one action at one or more of the input device, the first device, or the one or more secondary devices comprises transmitting a request related to the natural language utterance based on the preliminary intent prediction.

3. The method of claim 1, wherein the one or more secondary devices include at least a second device, the method further comprising:
    transmitting, by the first device, the natural language utterance to the second device;
    receiving, by the first device from the second device, a second intent prediction of the natural language utterance; and
    determining, by the first device, an intent of the natural language utterance based on the preliminary intent prediction and the second intent prediction, wherein the at least one action is invoked based on the determined intent.

4. The method of claim 3, the method further comprising:
    determining, by the first device, processing capabilities associated with the one or more secondary devices; and
    selecting, by the first device, based on the processing capabilities associated with the one or more secondary devices, the second device to make the second intent prediction of the natural language utterance.

5. The method of claim 4, the method further comprising:
    maintaining, by the first device, a constellation model that describes natural language resources, dynamic states, and intent determination capabilities associated with the input device and the one or more secondary devices, wherein the processing capabilities associated with the one or more secondary devices are determined based on the constellation model.

6. The method of claim 5, wherein the intent determination capabilities for a given one of the input device, the first device, or the one or more secondary devices are based on at least one of processing power, storage resources, natural language processing capabilities, or local knowledge.

7. The method of claim 3, the method further comprising:
    determining, by the first device, a domain relating to the natural language utterance; and
    selecting, by the first device, based on the domain, the second device to make the second intent prediction of the natural language utterance.

8. The method of claim 7, wherein the one or more secondary devices are associated with different domains, the second device is associated with the domain, and the different domains comprise the domain.

9. The method of claim 1, the method further comprising:
    communicating, by the first device, the natural language utterance to each of the one or more secondary devices, wherein each of the one or more secondary devices determine an intent of the natural language utterance received at the input device using local intent determination capabilities;
    receiving, by the first device, the intent determined by each of the secondary devices; and
    arbitrating, by the first device, among the intent determinations of the secondary devices to determine the intent of the natural language utterance, wherein the at least one action is invoked based on the arbitrated intent determinations.

10. The method of claim 1, wherein the input device initially received the natural language utterance.

11. A system for processing a natural language utterance in an integrated natural language voice services environment comprising a plurality of devices configured to connect to each other, the system comprising:
    an input device that receives the natural language utterance;
    one or more secondary devices; and
    a first device having one or more physical processors programmed with computer program instructions that, when executed by the one or more physical processors, program the first device to:
        obtain, from the input device, the natural language utterance;
        transcribe the natural language utterance;
        determine a preliminary intent prediction of the natural language utterance based on the transcription; and invoke at least one action at one or more of the input device, the first device, or the one or more secondary devices based on the preliminary intent prediction.

12. The system of claim 11, wherein to invoke the at least one action at one or more of the input device, the first device, or the one or more secondary devices, the first device is further programmed to:
transmit a request related to the natural language utterance based on the preliminary intent prediction.

13. The system of claim 11, wherein the one or more secondary devices include at least a second device, and wherein the first device is further programmed to:
transmit the natural language utterance to the second device;
receive, from the second device, a second intent prediction of the natural language utterance; and
determine an intent of the natural language utterance based on the preliminary intent prediction and the second intent prediction, wherein the at least one action is invoked based on the determined intent.

14. The system of claim 13, wherein the first device is further programmed to:
determine processing capabilities associated with the one or more secondary devices; and
select based on the processing capabilities associated with the one or more secondary devices, the second device to make the second intent prediction of the natural language utterance.

15. The system of claim 14, wherein the first device is further programmed to:
maintain a constellation model that describes natural language resources, dynamic states, and intent determination capabilities associated with the input device and the one or more secondary devices, wherein the processing capabilities associated with the one or more secondary devices are determined based on the constellation model.

16. The system of claim 15, wherein the intent determination capabilities for a given one of the input device, the first device, or the one or more secondary devices are based on at least one of processing power, storage resources, natural language processing capabilities, or local knowledge.

17. The system of claim 13, wherein the first device is further programmed to:
determine a domain relating to the natural language utterance; and
select, based on the domain, the second device to make the second intent prediction of the natural language utterance.

18. The system of claim 17, wherein the one or more secondary devices are associated with different domains, the second device is associated with the domain, and the different domains comprise the domain.

19. The system of claim 11, wherein the first device is further programmed to:
communicate the natural language utterance to each of the one or more secondary devices, wherein each of the one or more secondary devices determine an intent of the natural language utterance received at the input device using local intent determination capabilities;
receive the intent determined by each of the secondary devices; and
arbitrate among the intent determinations of the secondary devices to determine the intent of the natural language utterance, wherein the at least one action is invoked based on the arbitrated intent determinations.

20. The system of claim 11, wherein the input device initially received the natural language utterance.

* * * * *